US011038663B2

United States Patent
Tsuda et al.

(10) Patent No.: US 11,038,663 B2
(45) Date of Patent: Jun. 15, 2021

(54) APPARATUS FOR COMMUNICATING USING A FREQUENCY BAND WITH PRIORITY

(71) Applicant: Sony Corporation, Tokyo (JP)

(72) Inventors: Shinichiro Tsuda, Kanagawa (JP); Sho Furuichi, Tokyo (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 7 days.

(21) Appl. No.: 16/398,300

(22) Filed: Apr. 30, 2019

(65) Prior Publication Data

US 2019/0260562 A1 Aug. 22, 2019

Related U.S. Application Data

(63) Continuation of application No. 15/305,580, filed as application No. PCT/JP2015/056408 on Mar. 4, 2015, now Pat. No. 10,313,093.

(30) Foreign Application Priority Data

Jun. 4, 2014 (JP) .................................. 2014-115794
Nov. 19, 2014 (JP) ................................ 2014-234732

(51) Int. Cl.
*H04L 5/14* (2006.01)
*H04W 16/32* (2009.01)
(Continued)

(52) U.S. Cl.
CPC .............. *H04L 5/14* (2013.01); *H04L 5/0064* (2013.01); *H04W 16/32* (2013.01); *H04W 72/10* (2013.01);
(Continued)

(58) Field of Classification Search
CPC ........ H04L 5/14; H04L 5/0064; H04W 72/10; H04W 16/32; H04W 56/00; H04W 88/08; H04W 72/0453

See application file for complete search history.

(56) References Cited

U.S. PATENT DOCUMENTS

2009/0034457 A1 2/2009 Bahl et al.
2010/0113031 A1 5/2010 Kim et al.
(Continued)

FOREIGN PATENT DOCUMENTS

JP 2011-176588 A 9/2011
JP 2012-80312 A 4/2012
(Continued)

OTHER PUBLICATIONS

International Search Report and Written Opinion dated May 26, 2015 in PCT/JP2015/056408 filed Mar. 4, 2015.

*Primary Examiner* — Jae Y Lee
(74) *Attorney, Agent, or Firm* — Xsensus LLP

(57) ABSTRACT

[Object] To enable a frequency band to be used with higher efficiency.
[Solution] There is provided an apparatus including: an acquisition unit configured to acquire information regarding a second base station that is a second base station having a coverage area that overlaps a coverage area of a first base station capable of using a frequency band with priority, and is incapable of using the frequency band with priority; and a control unit configured to request the second base station to transmit data destined for a terminal apparatus that accesses the first base station to the terminal apparatus.

16 Claims, 14 Drawing Sheets

(51) Int. Cl.
*H04L 5/00* (2006.01)
*H04W 72/10* (2009.01)
*H04W 56/00* (2009.01)
*H04W 72/04* (2009.01)
*H04W 88/08* (2009.01)

(52) U.S. Cl.
CPC ........ *H04W 56/00* (2013.01); *H04W 72/0453* (2013.01); *H04W 88/08* (2013.01)

(56) References Cited

U.S. PATENT DOCUMENTS

| | | |
|---|---|---|
| 2012/0263067 A1 | 10/2012 | Kim et al. |
| 2013/0122917 A1 | 5/2013 | Yavuz et al. |
| 2013/0303114 A1 | 11/2013 | Ahmad et al. |
| 2014/0204771 A1 | 7/2014 | Gao et al. |
| 2015/0045032 A1* | 2/2015 | Tomici .............. H04W 28/0289 455/436 |
| 2015/0181601 A1* | 6/2015 | Schmidt .................. H04L 5/001 370/329 |
| 2015/0289263 A1 | 10/2015 | Ohta et al. |
| 2016/0007211 A1* | 1/2016 | Mochizuki ............ H04W 16/08 455/449 |
| 2016/0198482 A1 | 7/2016 | Kimura et al. |

FOREIGN PATENT DOCUMENTS

| | | |
|---|---|---|
| JP | 2013-197960 A | 9/2013 |
| WO | 2013/132920 A1 | 9/2013 |
| WO | 2014/006802 A1 | 1/2014 |

\* cited by examiner

FIG. 11

| | #0 | #1 | #2 | #3 | #4 | #5 | #6 | #7 | #8 | #9 |
|---|---|---|---|---|---|---|---|---|---|---|
| Configuration 0 | D | S | U | U | U | D | S | U | U | U |
| Configuration 1 | D | S | U | U | D | D | S | U | U | D |
| Configuration 2 | D | S | U | D | D | D | S | U | D | D |
| Configuration 3 | D | S | U | U | U | D | D | D | D | D |
| Configuration 4 | D | S | U | U | D | D | D | D | D | D |
| Configuration 5 | D | S | U | D | D | D | D | D | D | D |
| Configuration 6 | D | S | U | U | U | D | S | U | U | D |

APPARATUS FOR COMMUNICATING USING A FREQUENCY BAND WITH PRIORITY

CROSS-REFERENCE TO RELATED APPLICATIONS

This application is a continuation of U.S. application Ser. No. 15/305,580, filed on Oct. 20, 2016, which is based on PCT filing PCT/JP2015/056408, filed on Mar. 4, 2015, and claims priority to JP 2014-115794, filed on Jun. 4, 2014, and JP 2014-234732, filed on Nov. 19, 2014, the entire contents of each are incorporated herein by reference.

TECHNICAL FIELD

The present disclosure relates to an apparatus.

BACKGROUND ART 3G mobile telephone services called the third generation have been launched in Japan from 2002. At first, small-size packets were transmitted and received for voice calls, transmission of e-mails, and the like. Due to the introduction of High Speed Downlink Packet Access (HSDPA), however, larger-size packets have been transmitted and received for downloading music files, streaming of dynamic images, and the like.

According to the increase in packet volumes as described above, Long Term Evolution (LTE) which uses Orthogonal Frequency Division Multiple Access (OFDMA) in downlink has also been put in service for expanding radio network sides. Furthermore, 4G services are expected to start around 2015. Thus, a maximum of 1 Gbps (bit per second) can be realized in a semi-fixed environment, and a maximum of 100 Mbps can also be realized in a mobile environment. In addition, the use of small cells, for example, is under discussion in order to deal with hot spots in which traffic is regionally concentrated and to enhance use efficiency of frequency resources. Furthermore, introduction of a frequency sharing technology for causing a frequency band that is not temporally and regionally used and is called a white space to be shared by systems according to rules has been discussed. In addition, the introduction of a frequency sharing technology called a Spectrum Access System (SAS) has been discussed in North America in order to cause a frequency band that is not temporally or regionally used to be shared by systems according to rules.

For example, Patent Literature 1 discloses a technology in which, according to a traffic load of each of two or more access points (or the number of terminal apparatuses accessing them), bands are allocated to the two or more access points. Patent Literature 2 discloses, for example, a technology in which two evolved Node Bs (eNBs) share Radio Access Network (RAN) resources to realize load balancing.

CITATION LIST

Patent Literature

Patent Literature 1: US Patent Application Publication No. 2009/0034457
Patent Literature 2: US Patent Application Publication No. 2013/0303114

SUMMARY OF INVENTION

Technical Problem

The technologies disclosed in Patent Literatures 1 and 2 mentioned above, however, are based on the premise that nodes having the same priority level of (or the same right of) use of a frequency band share the frequency band. Thus, for example, there is a possibility of the frequency band not being efficiently used if there is no node having the same priority level on the frequency band.

Therefore, it is desirable to provide a mechanism which enables a frequency band to be used with higher efficiency.

Solution to Problem

According to the present disclosure, there is provided an apparatus including: an acquisition unit configured to acquire information regarding a second base station that is a second base station having a coverage area that overlaps a coverage area of a first base station capable of using a frequency band with priority, and is incapable of using the frequency band with priority; and a control unit configured to request the second base station to transmit data destined for a terminal apparatus that accesses the first base station to the terminal apparatus.

According to the present disclosure, there is provided an apparatus including: an acquisition unit configured to acquire data destined for a terminal apparatus that accesses a first base station capable of using a frequency band with priority when a second base station that is a second base station having a coverage area which overlaps a coverage area of the first base station, and is incapable of using the frequency band with priority receives a request to transmit the data to the terminal apparatus; and a control unit configured to control radio communication of the second base station so that the second base station transmits the data to the terminal apparatus.

Advantageous Effects of Invention

According to the present disclosure described above, it is possible to use a frequency band with higher efficiency. Note that the effects described above are not necessarily limitative. With or in place of the above effects, there may be achieved any one of the effects described in this specification or other effects that may be grasped from this specification.

BRIEF DESCRIPTION OF DRAWINGS

FIG. 11 is an illustrative diagram for describing seven existing TDD configurations.

DESCRIPTION OF EMBODIMENT(S)

Figure 1:
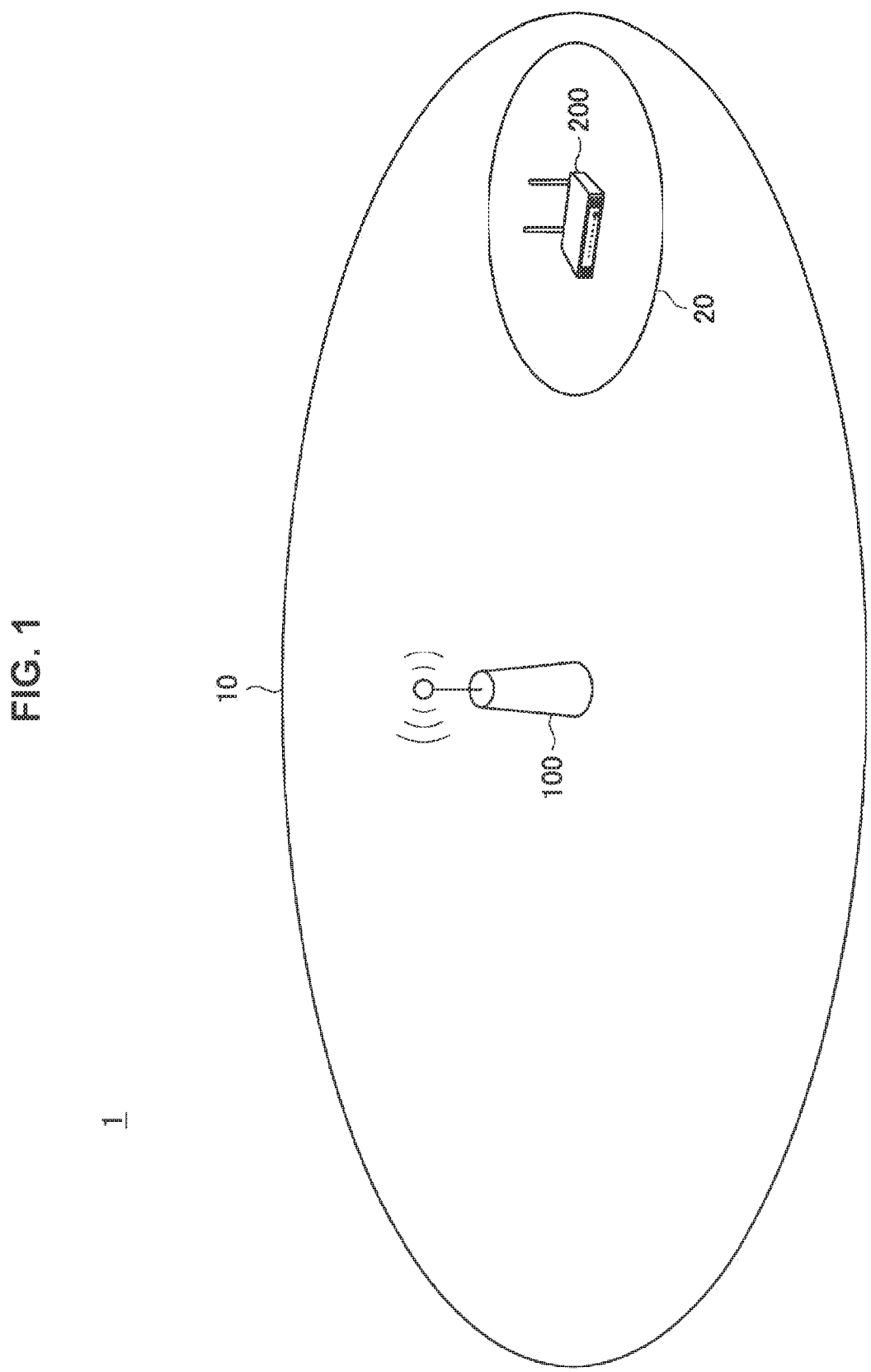
FIG. 1 is an illustrative diagram showing an example of a schematic configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Introduction
2. Schematic configuration of system
3. Configuration of first base station
4. Configuration of second base station
5. Three cases with regard to use of frequency bands
5.1. First case
5.2. Second case
5.3. Third case
6. Consideration of another radio communication system having higher priority level
7. Process flow
8. Modified examples
8.1. First modified example
8.2. Second modified example
9. Other embodiment
10. Application examples
10.1. Application example regarding other network node
10.2. Application example regarding base station
10.3. Application example regarding terminal device
11. Conclusion

1. INTRODUCTION

First, a frequency sharing technology called Spectrum Access System (SAS) will be described.

A "Notice of Proposed Rulemaking and Order" that was issued by the Federal Communications Commission (FCC) in December 2012 proposes creation of a new citizens' broadband service in a 3.5 GHz band in North America. The 3.5 GHz band has been in use for application to non-federal fixed-satellite services and radars of the Department of Defense (i.e., "Incumbent Use"). Thus, a dynamic sharing model using the SAS has been introduced to start preparing for a framework for also using a frequency band for the "Incumbent Use" in the new citizens' broadband service.

In a "three-tiered licensing proposal" of the "Notice of Proposed Rulemaking and Order" described above, respective users of the frequency band are classified into one of three groups. Each of these groups is called a "tier." The three groups are called "Incumbent Access," "Priority Access," and "General Authorized Access (GAA)." In use of the frequency band, a priority level of "Incumbent Access" is the highest, a priority level of "Priority Access" is the second highest, and a priority level of "General Authorized Access" is the lowest.

"Incumbent Access" is a user group that includes users who uses the frequency band for "Incumbent Use." "Incumbent Access" is not required to avoid or suppress interference with "Priority Access" and "General Authorized Access" that have lower priority levels than it. In addition, "Incumbent Access" is protected from being interfered with by "Priority Access" and "General Authorized Access." That is, users of "Incumbent Access" use the frequency band without considering the presence of other groups.

"Priority Access" is required to avoid or suppress interference with "Incumbent Access" that has a higher priority level, but is not required to avoid or suppress interference with "General Authorized Access" that has the lower priority level. In addition, "Priority Access" is not protected from interference of the "Incumbent Access" that has a higher priority level, but is protected from interference of "General Authorized Access" that has the lower priority level.

"General Authorized Access" is required to avoid or suppress interference with "Incumbent Access" and "Priority Access" that have higher priority levels. In addition, "General Authorized Access" is not protected from interference of "Incumbent Access" and "Priority Access" that have higher priority levels. That is, users of "General Authorized Access" are in a "tier" that is only allowed opportunistic use.

2. SCHEMATIC CONFIGURATION OF SYSTEM

Next, a schematic configuration of a system 1 according to an embodiment of the present disclosure will be described with reference to FIGS. 1 to 7. FIG. 1 is an illustrative diagram showing an example of a schematic configuration of the system 1 according to the embodiment of the present disclosure. With reference to FIG. 1, the system 1 includes a first base station 100 and a second base station 200.

(First Base Station 100)

The first base station 100 performs radio communication with terminal apparatuses. The first base station 100, for example, performs radio communication with terminal apparatuses positioned in a coverage area 10 of the first base station 100. The first base station 100, for example, transmits data and/or control information to terminal apparatuses and receives data and/or control information from the terminal apparatuses.

The first base station 100 communicates with other network nodes. For example, the first base station 100 communicates with the second base station 200.

(Second Base Station 200)

The second base station 200 performs radio communication with terminal apparatuses. For example, the second base station 200 has a coverage area 20 that overlaps the coverage area 10 of the first base station 100, and performs radio communication with terminal apparatuses positioned in the coverage area 20. For example, the second base station 200 transmits data and/or control information to terminal apparatuses and receives data and/or control information from the terminal apparatuses. Note that only a part of the coverage area 20 may overlap the coverage area 10, or the whole of the coverage area 20 may overlap the coverage area 10.

The second base station 200 communicates with, for example, other network nodes. For example, the second base station communicates with the first base station 100.

(Relationship Between First Base Station 100 and Second Base Station 200)

The first base station 100 is, for example, a base station of a macrocell, and the second base station 200 is a base station of a small cell that overlaps the macrocell. In other words, the coverage area 10 is a macrocell, and the coverage area 20 is a small cell.

The first base station 100 is, for example, a base station of a first radio communication system, and the second base station 200 is a base station of a second radio communication system that is different from the first radio communication system.

The first base station 100 is, for example, a base station operated by a first service provider, and the second base station 200 is a base station operated by a second service provider that is different from the first service provider. As an example, the first base station 100 may be a base station operated by a first mobile network operator (MNO), and the second base station 200 may be a base station operated by a second MNO. As another example, the first base station 100 may be a base station operated by an MNO, and the second base station 200 may be a base station operated by a mobile virtual network operator (MVNO).

Note that the second base station 200 may be a terminal apparatus which may operate as a base station. Specifically, for example, the second base station 200 may be a terminal apparatus that is a master node of a localized network, a terminal apparatus that performs tethering, a mobile router, or the like.

The first base station 100 (or the first radio communication system) and the second base station 200 (or the second radio communication system) perform, for example, radio communication according to the same communication scheme. As an example, the same communication scheme is LTE or LTE-Advanced. Alternatively, the same communication scheme may be Wideband Code Division Multiple Access (W-CDMA) that includes High Speed Downlink Packet Access (HSPA), Worldwide Interoperability for Microwave Access (WiMAX), IEEE 802.11, or the like. Note that the first base station 100 (or the first radio communication system) and the second base station 200 (or the second radio communication system) may perform radio communication according to different communication schemes.

(Use of Frequency Band)

In the embodiment of the present disclosure, the first base station 100 can use a frequency band with priority. For example, the first radio communication system that includes the first base station 100 can use the frequency band with priority. As an example, the first base station 100 (or the first radio communication system) is a user of "Priority Access" in the frequency band in the SAS.

Furthermore, the second base station 200 is incapable of using the frequency band with priority in the embodiment of the present disclosure. For example, the second radio communication system that includes the second base station 200 is incapable of using the frequency band with priority. As an example, the second base station 200 (or the second radio communication system) is a user of "General Authorized Access (GAA)" in the frequency band in the SAS.

(a) First Example

As a first example, the second base station 200 can use the frequency band under the condition that interference with a radio communication system which can use the frequency band with priority be avoided or suppressed. The radio communication system is, for example, the first radio communication system that includes the first base station 100. Thus, the radio communication system can use the frequency band, for example, regardless of the presence of the second base station 200.

The second base station 200 can use, for example, a part or the whole of the frequency band in a period in which the radio communication system does not use the part or the whole of the frequency band. Thus, the second base station 200, for example, avoids interference with the radio communication system (for example, the first base station 100).

The first base station 100 (for example, a control unit 153 to be described below), for example, notifies the second base station 200 of the period. Thus, the second base station 200, for example, can use the frequency band during the period. Note that another network node (for example, a frequency management system that manages the frequency band) may notify the second base station 200 of the period in place of the first base station 100.

An example of use of a frequency band with priority will be described below with reference to FIG. 2.

Figure 2:
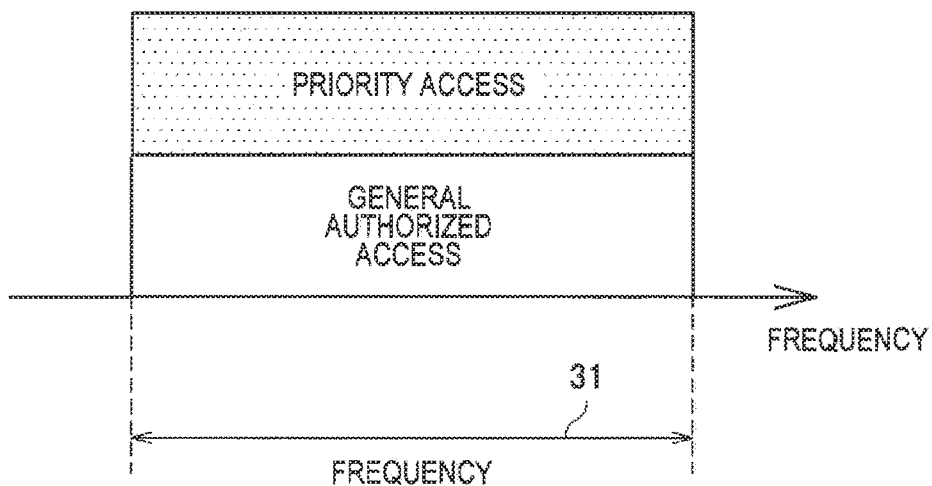
FIG. 2 is an illustrative diagram for describing a first example of prioritized use of a frequency band.

FIG. 2 is an illustrative diagram for describing the first example of use of a frequency band with priority. Referring to FIG. 2, a frequency band 31 is shown. The first base station 100 can use the frequency band 31 with priority. On the other hand, the second base station 200 can use the frequency band 31 under the condition that interference with a radio communication system which can use the frequency band 31 with priority (for example, the first radio communication system that includes the first base station 100) be avoided or suppressed. Specifically, the frequency band 31 is, for example, a band for both "Priority Access" and "General Authorized Access (GAA)" in the SAS, the first base station 100 is a user of "Priority Access" in the frequency band 31, and the second base station 200 is a user of "General Authorized Access" in the frequency band 31.

Note that the second base station 200 may be capable of using another frequency band different from the frequency band. A specific example of this point will be described below with reference to FIG. 3.

Figure 3:
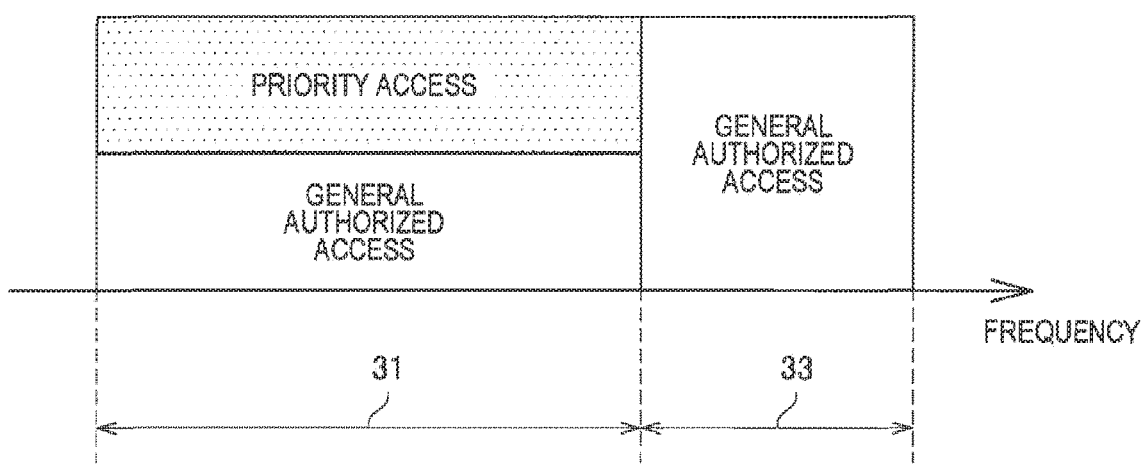
FIG. 3 is an illustrative diagram for describing an example of another frequency band.

FIG. 3 is an illustrative diagram for describing an example of another frequency band. Referring to FIG. 3, the frequency band 31 and a frequency band 33 are shown. The second base station 200 can use the frequency band 33. Specifically, the frequency band 33 is, for example, a band for "General Authorized Access (GAA)" in the SAS, and the second base station 200 is a user of "General Authorized Access" in the frequency band 33.

(b) Second Example

As a second example, the second base station 200 may be incapable of using the frequency band without permission. Thus, the first base station 100 can use the frequency band, for example, regardless of the presence of the second base station 200 in principle.

The permission is, for example, permission granted by the first base station 100. Note that the permission may be permission granted by another node (as an example, a frequency management system that manages frequency bands).

An example of use of a frequency band with priority will be described below with reference to FIG. 4.

Figure 4:
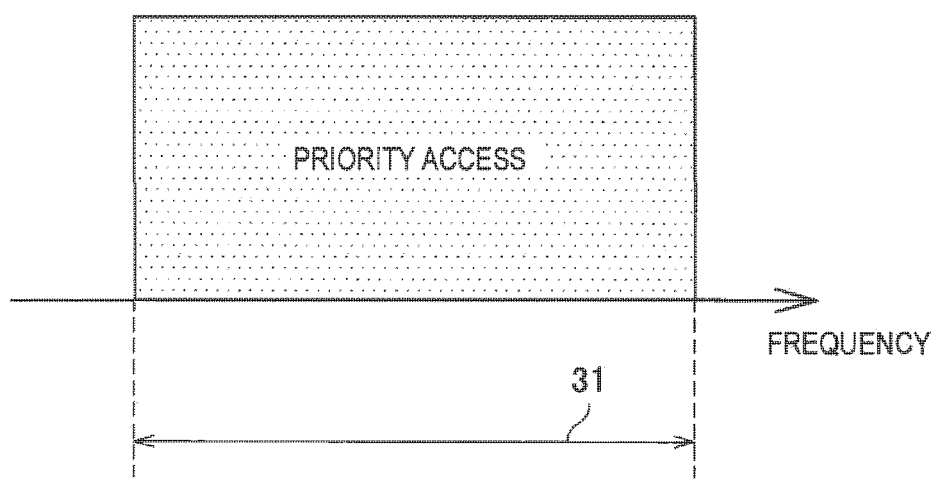
FIG. 4 is an illustrative diagram for describing a second example of prioritized use of a frequency band.

FIG. 4 is an illustrative diagram for describing a second example of use of a frequency band with priority. Referring to FIG. 4, the frequency band 31 is shown. The first base station 100 can use the frequency band 31 with priority. On the other hand, the second base station 200 is incapable of using the frequency band 31 without permission. Specifically, the frequency band 31 is, for example, a band for "Priority Access" in the SAS, the first base station 100 is a user of "Priority Access" in the frequency band 31, and the second base station 200 is not a user of "Priority Access" in the frequency band 31.

Note that the second base station 200 may be capable of using another frequency band different from the frequency band. A specific example of this point will be described below with reference to FIG. 5.

Figure 5:
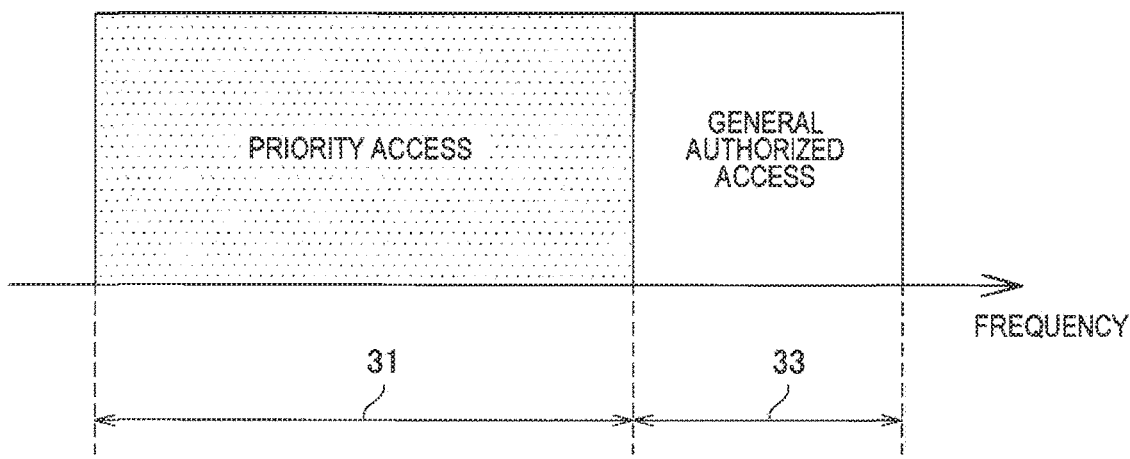
FIG. 5 is an illustrative diagram for describing an example of another frequency band.

FIG. 5 is an illustrative diagram for describing an example of another frequency band. Referring to FIG. 5, the frequency band 31 and the frequency band 33 are shown. The base station 200 can use the frequency band 33. Specifically, the frequency band 33 is, for example, a band for "General Authorized Access (GAA)" in the SAS, and the second base station 200 is a user of "General Authorized Access" in the frequency band 33.

(c) Third Example

The first and the second examples described above may be combined. An example of use of a frequency band with priority with regard to this point will be described with reference to FIG. 6.

Figure 6:
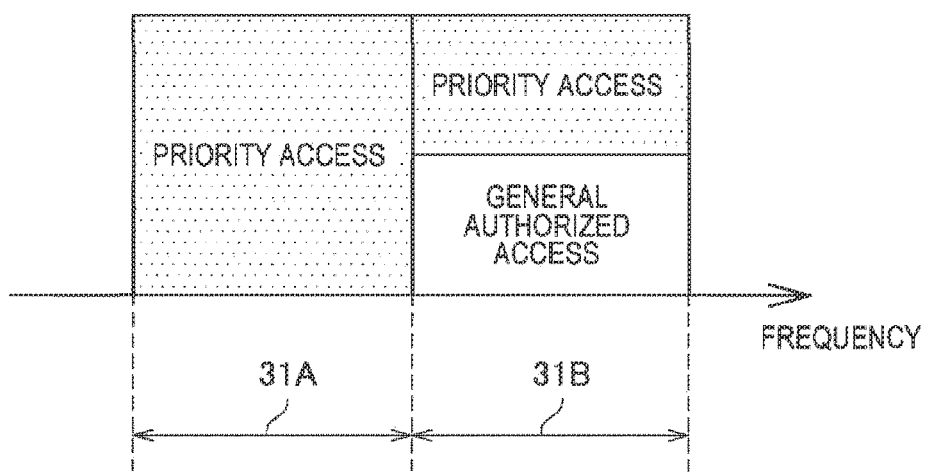
FIG. 6 is an illustrative diagram for describing a third example of prioritized use of a frequency band.

FIG. 6 is an illustrative diagram for describing a third example of use of a frequency band with priority. Referring to FIG. 6, a frequency band 31A and a frequency band 31B are shown. The first base station 100 can use the frequency band 31A and the frequency band 31B with priority. On the other hand, the second base station 200 is incapable of using the frequency band 31A without permission, but can use the frequency band 31B under the condition that interference with a radio communication system which can use the frequency band 31B with priority be avoided or suppressed. Specifically, the frequency band 31A is, for example, a band for "Priority Access" in the SAS, and the frequency band 31B is a band for both "Priority Access" and "General Authorized Access (GAA)" in the SAS. Thus, the first base station 100 is a user of "Priority Access" in the frequency band 31A and the frequency band 31B, and the second base station 200 is a user of "General Authorized Access" in the frequency band 31B.

Note that the second base station 200 may also be capable of using another frequency band that is different from the frequency bands. A specific example of this point will be described below with reference to FIG. 7.

Figure 7:
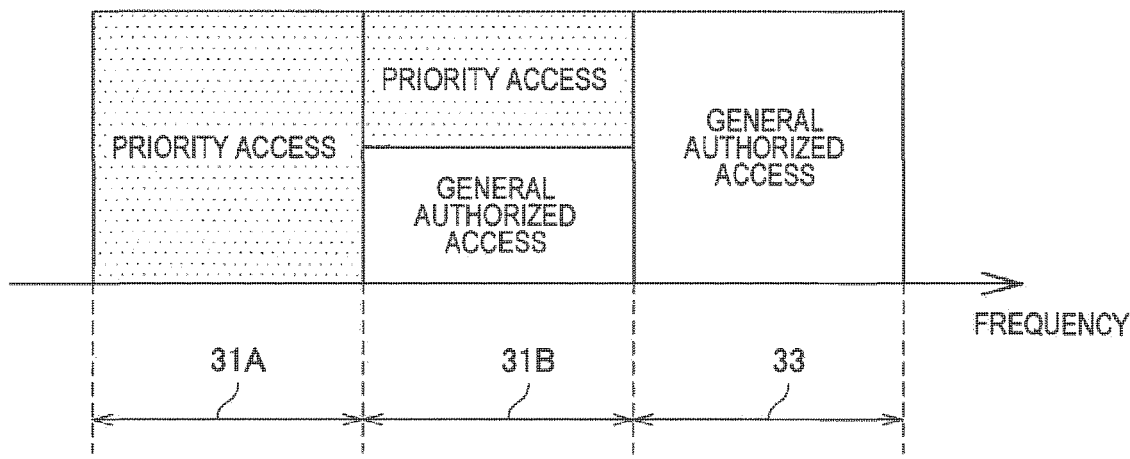
FIG. 7 is an illustrative diagram for describing an example of another frequency band.

FIG. 7 is an illustrative diagram for describing an example of another frequency band. Referring to FIG. 7, the frequency band 31A, the frequency band 31B and the frequency band 33 are shown. The base station 200 can use the frequency band 33. Specifically, the frequency band 33 is, for example, a band for "General Authorized Access (GAA)" in the SAS, and the second base station 200 is a user of "General Authorized Access" in the frequency band 33.

The frequency bands that the first base station 100 can use with priority have been described above. Note that there may of course be two or more frequency bands that the first base station 100 can use with priority.

(Another Radio Communication System Having a Higher Priority Level)

The above-described frequency band is, for example, a band used by another radio communication system (which will be referred to as a "third radio communication system" below) with priority over the radio communication system (i.e., the first radio communication system) that includes the first base station 100. In this case, the first base station 100 can use the frequency band under the condition that interference with the third radio communication system be avoided or suppressed.

As an example, the third radio communication system is a user of "Incumbent Access" in the frequency band in the SAS. Furthermore, the first base station 100 (or the first radio communication system that includes the first base station 100) is a user of "Priority Access" in the SAS. In addition, the second base station 200 (or the second radio communication system that includes the second base station 200) is a user of "General Authorized Access" in the SAS.

Note that the frequency band may be a part of a band used by the third radio communication system. For example, referring to the examples of FIGS. 3, 5, and 7 again, the band used by the third radio communication system may further include the frequency band 33 in addition to the frequency bands 31. Alternatively, the frequency band may be the whole of a band used by the third radio communication system. Referring to the examples of FIGS. 2, 4, and 6 again, the band used by the third radio communication system may be the frequency bands 31 only.

A way in which the first base station 100 can use the frequency band will be described below in detail.

3. CONFIGURATION OF FIRST BASE STATION

Figure 8:
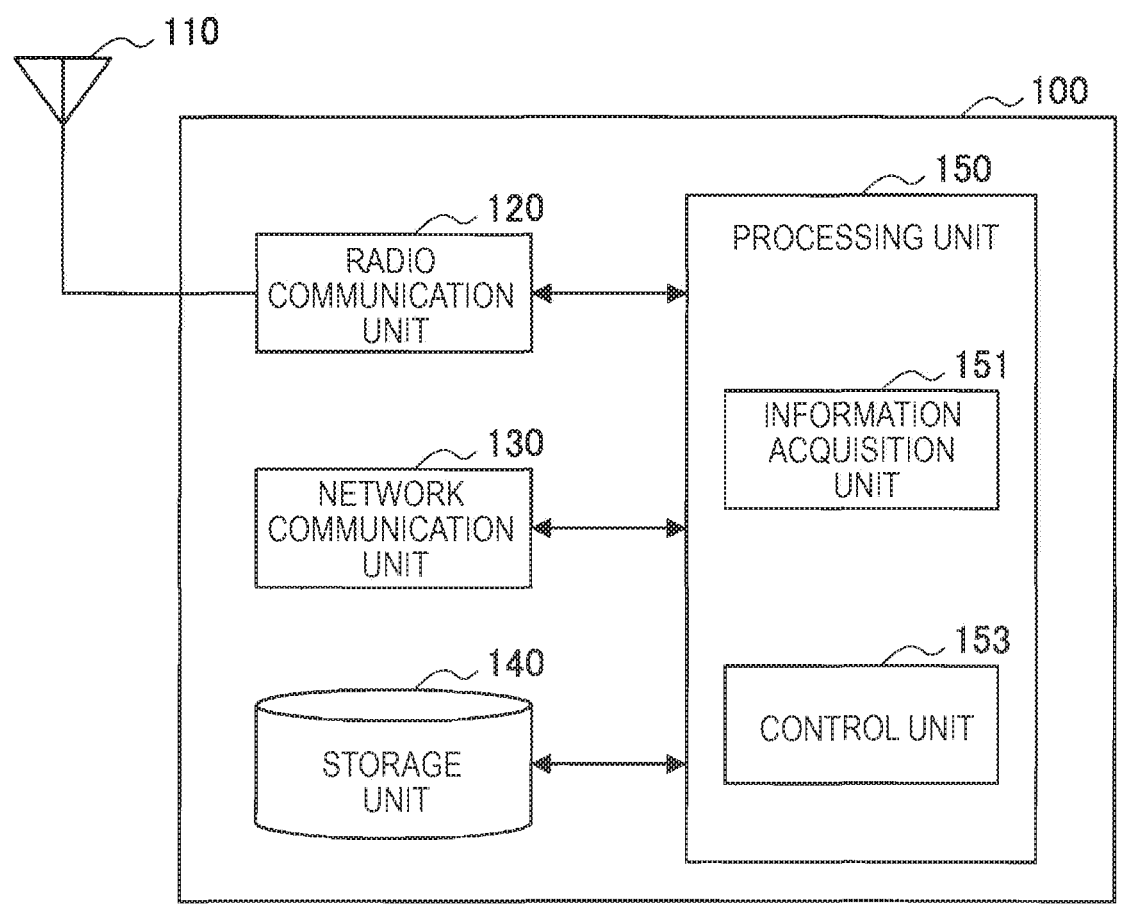
FIG. 8 is a block diagram showing an example of a configuration of a first base station according to the embodiment.

An example of a configuration of the first base station 100 according to the embodiment of the present disclosure will be described with reference to FIG. 8. FIG. 8 is a block diagram showing the example of the configuration of the first base station 100 according to the embodiment of the present disclosure. Referring to FIG. 8, the first base station 100 has an antenna unit 110, a radio communication unit 120, a network communication unit 130, a storage unit 140, and a processing unit 150.

(Antenna Unit 110)

The antenna unit 110 emits signals output by the radio communication unit 120 as radio waves to a space. In addition, the antenna unit 110 converts radio waves from the space into signals, and outputs the signals to the radio communication unit 120.

(Radio Communication Unit 120)

The radio communication unit 120 transmits and receives signals. For example, the radio communication unit 120 transmits downlink signals to terminal apparatuses positioned in the coverage area 10 and receives uplink signals from terminal apparatuses positioned in the coverage area 10.

(Network Communication Unit 130)

The network communication unit 130 transmits and receives information. For example, the network communication unit 130 transmits information to other network nodes and receives information from other network nodes. The other network nodes include, for example, the second base station 200.

(Storage Unit 140)

The storage unit 140 temporarily or permanently stores programs and data for operations of the first base station 100.

(Processing Unit 150)

The processing unit 150 provides various functions of the first base station 100. The processing unit 150 includes an information acquisition unit 151 and a control unit 153. Note that the processing unit 150 can further include another constituent element in addition to these constituent elements. In other words, the processing unit 150 can perform operations in addition to operations of these constituent elements.

(Information Acquisition Unit 151)

The information acquisition unit 151 acquires information with regard to the second base station 200. As described above, the second base station 200 has the coverage area 20 that overlaps the coverage area 10 of the first base station 100, and is incapable of using the frequency band with priority that is available to the first base station 100 with priority.

The information with regard to the second base station 200 includes, for example, identification information of the second base station 200 (for example, a cell ID), an address of the second base station 200 (for example, an IP address), position information indicating a position of the second base station 200, and/or a measurement result on the second base station 200 obtained by a terminal apparatus.

The information with regard to the second base station 200 is, for example, stored in the storage unit 140, and the information acquisition unit 151 acquires the information from the storage unit 140.

(Control Unit 153)

The control unit 153 requests that the second base station 200 transmit data destined for a terminal apparatus that accesses the first base station 100 to the terminal apparatus.

(a) Terminal Apparatus

The terminal apparatus is, for example, a terminal apparatus positioned close to the second base station 200. Specifically, the terminal apparatus is, for example, a terminal apparatus positioned in the coverage area 20 of the second base station 200.

As an example, the control unit 153 determines that the terminal apparatus is positioned close to the second base station 200 based on a position of the terminal apparatus or a measurement result on the second base station 200 obtained by the terminal apparatus. For example, the control unit 153 may set a measurement gap and instruct the terminal apparatus to measure reception quality of a reference signal transmitted by the second base station 200 in the measurement gap.

(b) Specific Process

The control unit 153, for example, transmits, to the second base station 200, control information (for example, a message, a command, or the like) for requesting transmission of the above-described data to the terminal apparatus via the network communication unit 130. In addition, the control unit 153, for example, forwards the data to the second base station 200 via the network communication unit 130.

(c) Trigger

As an example, when a traffic amount or a traffic load of the first base station 100 is equal to or greater than a threshold value, the control unit 153 requests that the data be transmitted from the second base station 200 to the terminal apparatus.

As another example, when the terminal apparatus is determined to be positioned close to the second base station 200, the control unit 153 can request that the data be transmitted from the second base station 200 to the terminal apparatus.

Note that a trigger of the request is not limited to the above examples, and various kinds of triggers can be applied to the embodiment of the present disclosure.

As described above, the control unit 153 requests that the second base station 200 transmit data destined for the terminal apparatus that accesses the first base station 100 to the terminal apparatus. Thereby, for example, the second base station 200 transmits the data to the terminal apparatus. As a result, for example, a frequency band can be used with higher efficiency. More specifically, for example, even when there is no other base station (for example, a base station of a small cell) of the radio communication system that includes the first base station 100 around the first base station 100, the second base station closer to the terminal apparatus, for example, can transmit the data to the terminal apparatus instead of the first base station 100. As a result, the data can be transmitted to the terminal apparatus using fewer radio resources due to the effect of link adaptation. Alternatively, the data can be transmitted to the terminal apparatus with higher reliability using the same amount of radio resources. In other words, traffic off-loading can be realized. In this way, the frequency band can be used with higher efficiency.

Note that the control unit 153 performs other operations entailed by the request that the data be transmitted. The other operations will be described below in detail.

4. CONFIGURATION OF SECOND BASE STATION

Figure 9:
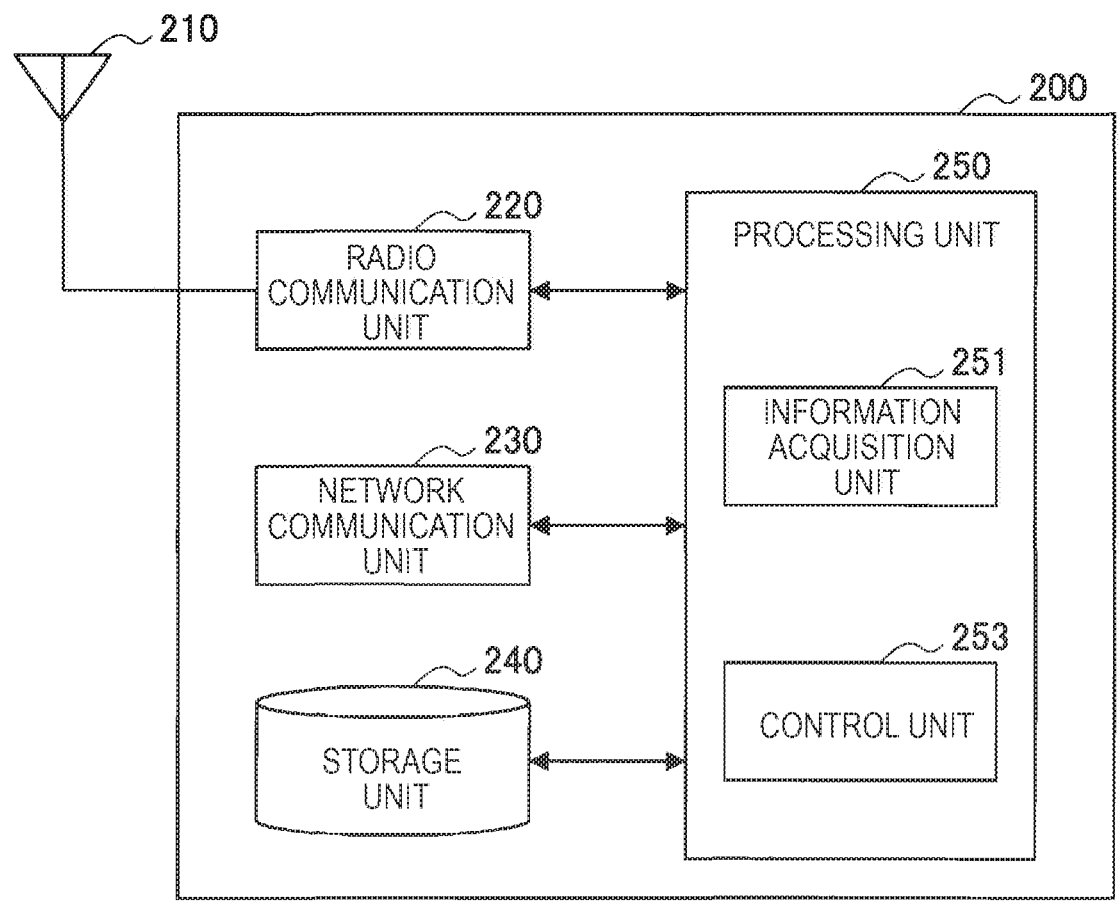
FIG. 9 is a block diagram showing an example of a configuration of a second base station according to the embodiment.

An example of a configuration of the second base station 200 according to the embodiment of the present disclosure will be described with reference to FIG. 9. FIG. 9 is a block diagram showing the example of the configuration of the second base station 200 according to the embodiment of the present disclosure. Referring to FIG. 9, the second base station 200 has an antenna unit 210, a radio communication unit 220, a network communication unit 230, a storage unit 240, and a processing unit 250.

(Antenna Unit 210)

The antenna unit 210 emits signals output by the radio communication unit 220 as radio waves to a space. In addition, the antenna unit 210 converts radio waves from the space into signals, and the signals are output to the radio communication unit 220.

(Radio Communication Unit 220)

The radio communication unit 220 transmits and receives signals. For example, the radio communication unit 220 transmits downlink signals to terminal apparatuses positioned in the coverage area 20 and receives uplink signals from terminal apparatuses positioned in the coverage area 20.

(Network Communication Unit 230)

The network communication unit 230 transmits and receives information. For example, the network communication unit 230 transmits information to other network nodes and receives information from other network nodes. The other network nodes include, for example, the first base station 100.

(Storage Unit 240)

The storage unit 240 temporarily or permanently stores programs and data for operations of the second base station 200.

(Processing Unit 250)

The processing unit 250 provides various functions of the second base station 200. The processing unit 250 includes the information acquisition unit 251 and the control unit 253. Note that the processing unit 250 can further include another constituent element in addition to these constituent elements. In other words, the processing unit 250 can perform operations in addition to operations of these constituent elements.

(Information Acquisition Unit 251)

When it is requested to the second base station 200 that the second base station 200 transmit data destined for a terminal apparatus that accesses the first base station 100 to the terminal apparatus, the information acquisition unit 251 acquires the data. Here, the terminal apparatus that accesses the first base station 100 may at least have accessed the first base station 100 to transmit and receive control information (a C-plane).

As described above, the first base station 100 requests that the second base station 200 transmit data destined for a terminal apparatus that accesses the first base station 100 to the terminal apparatus. More specifically, the first base station 100 transmits, for example, control information (for example, a message, a command, or the like) for requesting that the data be transmitted to the second base station 200. In addition, the first base station 100, for example, forwards the data to the second base station 200. Then, the data is stored in the storage unit 240. At any timing thereafter, the information acquisition unit 251 acquires the data from the storage unit 240.

(Control Unit 253)

The control unit 253 controls radio communication of the second base station 200 so that the second base station 200 transmits the data to the terminal apparatus.

For example, the control unit 253 performs scheduling of transmission of the data. In other words, the control unit 253 allocates radio resources of a band to be used for transmitting the data to a signal of the data. Then, the control unit 253 maps the signal of the data to the allocated radio resources. In other words, the storage unit 240 serves as a buffer in control of transmission of the data.

Note that the control unit 253 performs other operations entailed by the transmission of the data. The other operations will be described below in detail. Note that the control unit 253 may not only control the second base station 200 to transmit the data to the terminal apparatus, but also control the second base station 200 to receive data from the terminal apparatus. Here, the control for reception includes, for example, instructing the terminal apparatus to map a signal of the data to allocated radio resources.

5. THREE CASES WITH REGARD TO USE OF FREQUENCY BANDS

Next, three cases with regard to use of frequency bands for transmission of the data will be described. The three cases are summarized as follows.

TABLE 1

| Cases | Frequency band used for transmission of data | |
|---|---|---|
| | Frequency band that first base station can use with priority | Other frequency band that second base station can use |
| First case | ◯ | |
| Second case | | ◯ |
| Third case | ◯ (When selected) | ◯ (When selected) |

5.1. First Case

In a first case, the second base station 200 uses a frequency band (i.e., a frequency band that the second base station 200 is incapable of using with priority) that is available to the first base station 100 with priority to transmit the data destined for the terminal apparatus that accesses the first base station 100 to the terminal apparatus.

(Operations of First Base Station 100)

(a) Request for Transmission of Data

The first base station 100 (the control unit 153), for example, requests that the second base station 200 transmit the data to the terminal apparatus using the frequency band.

(b) Permission to Use Frequency Band

The first base station 100 (the control unit 153), for example, permits the second base station 200 to use the frequency band.

Permitted Use

The first base station 100 (the control unit 153), for example, permits the second base station 200 to use a part or the whole of the frequency band in a period in which the first base station 100 does not use the part or the whole of the frequency band.

Referring to FIGS. 2 to 7 again, the first base station 100 (the control unit 153), for example, permits the second base station 200 to use the frequency band 31 in a period in which the first base station 100 does not use the whole of the frequency band 31. Alternatively, the first base station 100 (the control unit 153) permits the second base station 200 to use a part of the frequency band 31 in the period in which the first base station 100 does not use the part of the frequency band 31.

Accordingly, for example, it is possible to avoid interference of the second base station 200 with the first base station 100.

Note that the period may be one or more radio frames or one or more subframes, and may be a period indicated as times (for example, a start time and an end time, or a start time and a length of a period).

Specific Process

Decision

The first base station 100 (the control unit 153), for example, decides a period in which the first base station 100 does not use a part or the whole of the frequency band 31. In addition, the first base station 100 (the control unit 153) also decides a part of the frequency band to permit use of the part of the frequency band.

Notification to Terminal Apparatus

The first base station 100 (the control unit 153), for example, notifies the second base station 200 of the period. In addition, when use of a part of the frequency band is permitted for use, the first base station 100 (the control unit 153), for example, also notifies the second base station 200 of the part of the frequency band.

When requesting that the second base station 200 transmit the data to the terminal apparatus, for example, the first base station 100 notifies the second base station 200 of the period (and the part of the frequency band). Specifically, the first base station 100, for example, generates control information (for example, a message, a command, or the like) that is control information for requesting that the data be transmitted to the terminal apparatus indicating the period (and the part of the frequency band), and transmits the control information to the second base station 200.

Note that the transmission of the information indicating the period to the second base station 200 can be considered as being equivalent to permitting use of the frequency band. In addition, the transmission of the information indicating the period (and the part of the frequency band) to the second base station 200 can be considered as being equivalent to requesting that the data be transmitted.

Non-Use

The first base station 100, for example, does not use the part or the whole of the frequency band in the period.

The control unit 153 of the first base station 100, for example, controls radio communication of the first base station 100 so that the first base station 100 does not use the part or the whole of the frequency band. Specifically, the control unit 153, for example, does not map a signal to radio resources of the part or the whole of the frequency band in the period.

Note that, when the second base station 200 uses the part of the frequency band, a guard band may be provided between the band of the part and the remaining band. In addition, the part of the frequency band may be decided by taking the guard band into consideration.

Cancellation of Permission

The first base station 100 (the control unit 153) may cancel permission for the second base station to use the frequency band.

The first base station 100 (the control unit 153) may decide to cancel permission to use the frequency band, and may instruct the second base station 200 to stop using the frequency band. Note that the second base station 200 may notify the first base station 100 of the fact that the use of the frequency band has stopped, and the first base station 100 may start using the frequency band after the notification from the second base station 200.

Accordingly, the first base station 100 can more flexibly use the frequency band.

As described above, the first base station 100 (the control unit 153), for example, permits the second base station 200 to use the frequency band. Accordingly, the second base station 200, for example, can use the frequency band with priority, like the first base station 100.

Note that, when the second base station 200 can use the frequency band albeit no priority provided, as described with reference to FIG. 2 and the like, for example, the first base station 100 (the control unit 153) may not permit the second base station 200 to use the frequency band. In this case, the second base station 200 may use the frequency band, albeit no priority provided, to transmit the data to the terminal apparatus.

(c) Instruction of Use of SCC

The first base station 100 (the control unit 153), for example, instructs the terminal apparatus to use a band which is used by the second base station 200 to transmit the data as a secondary component carrier (SCC) accompanied by a primary component carrier (PCC) used by the first base station 100.

More specifically, the control unit 153, for example, activates the band as an SCC accompanied by a PCC (a PCC for the terminal apparatus) used by the first base station 100. As an example, the control unit 153 transmits a Radio Resource Control (RRC) connection reconfiguration message for activating the band as an SCC to the terminal apparatus via the antenna unit 110 and the radio communication unit 120. As another example, the control unit 153 may transmit a Media Access Control (MAC) control element for activating the band as an SCC via the antenna unit 110 and the radio communication unit 120.

Accordingly, for example, the second base station 200 can transmit the data to the terminal apparatus without handover of the terminal apparatus.

Note that, in the first case, the band used by the second base station 200 to transmit the data is the frequency band that is available to the first base station 100 with priority.

(d) Transmission of Scheduling Information

The first base station 100 (the control unit 153), for example, transmits scheduling information indicating a result of scheduling the transmission of the data by the second base station 200 to the terminal apparatus.

Specifically, for example, the second base station 200 performs the scheduling and transmits the scheduling information to the first base station 100 as will be described below. Then, the first base station 100 (the control unit 153) transmits the scheduling information to the terminal apparatus. The first base station 100 transmits the scheduling information to the terminal apparatus using, for example, the frequency band or another frequency band (for example, a PCC of the terminal apparatus) that the first base station 100 uses for radio communication with the terminal apparatus. The first base station 100 transmits the scheduling information to the terminal apparatus on, for example, a control channel (for example, a Physical Downlink Control Channel (PDCCH)).

Note that the first base station 100 may perform the scheduling instead of the second base station 200 performing the scheduling. In addition, the second base station 200 may transmit the scheduling information to the terminal apparatus instead of the first base station 100 transmitting the scheduling information to the terminal apparatus.

(Operation of Second Base Station 200)

(a) Transmission of Data

The second base station 200 transmits the data to the terminal apparatus using the frequency band. For example, the control unit 253 of the second base station 200 controls radio communication of the second base station 200 so that the second base station 200 uses the frequency band to transmit the data to the terminal apparatus.

Transmission with Permission

The first base station 100, for example, permits the second base station 200 to use a part or the whole of the frequency band in a period in which the first base station 100 does not use the part or the whole of the frequency band. Then, the second base station 200 uses the part or the whole of the frequency band to transmit the data to the terminal apparatus. For example, the control unit 253 of the second base station 200 controls radio communication of the second base station 200 so that the second base station 200 transmits the data to the terminal apparatus using the part or the whole of the frequency band.

Note that, the first base station 100 notifies the second base station 200 of the period (and the part of the frequency band) as described above.

Specific Process

The control unit 253, for example, performs scheduling for transmitting the data. That is, the control unit 253 allocates radio resources of the part or the whole of the frequency band to a signal of the data. Then, the control unit 253 maps the signal of the data to the allocated radio resources.

Note that the first base station 100 may perform the scheduling instead of the second base station 200 performing the scheduling.

(b) Use of Frequency Band as SCC

The second base station 200, for example, uses the band used to transmit the data as an SCC accompanied by a PCC used by the first base station 100. For example, the control unit 253 controls radio communication of the second base station 200 so that the second base station 200 uses the band as the SCC.

Accordingly, the second base station 200 can transmit the data to the terminal apparatus, for example, without handover of the terminal apparatus.

Note that, in the first case, the band used by the second base station 200 to transmit the data is the frequency band that is available to the first base station 100 with priority.

(c) Transmission of Scheduling Information

The second base station 200 (the control unit 253), for example, transmits scheduling information indicating a result of the scheduling to the first base station 100. Then, the first base station 100 transmits the scheduling information to the terminal apparatus.

Note that the second base station 200 (the control unit 253) may transmit the scheduling information to the terminal apparatus instead of the first base station 100 transmitting the scheduling information to the terminal apparatus. The second base station 200 may transmit the scheduling information to the terminal apparatus on, for example, a control channel (for example, a PDCCH).

(d) Additional Transmission of Data

When an amount of radio resources that is available to the second base station 200 among radio resources of the frequency band is greater than that of radio resources used to transmit the data to the terminal apparatus, the second base station 200 may use the extra radio resources to transmit other data to the terminal apparatus or another terminal apparatus. Accordingly, the radio resources of the frequency band, for example, are more effectively used.

(Synchronization of the First Base Station 100 and the Second Base Station 200)

The first base station 100 and the second base station 200, for example, are synchronized with each other.

The first base station 100 and the second base station 200 are synchronized with each other for, for example, the frequency band. The first base station 100 and the second base station 200 are synchronized with each other for, for example, the frequency band in a time direction and/or a frequency direction.

As an example, the second base station 200 may be synchronized with the first base station 100 based on a synchronization signal transmitted by the first base station 100. As another example, the second base station 200 may be provided with information for synchronizing with the first base station 100 from another network node (for example, the first base station 100 or a core network node) and thus be synchronized with the first base station 100 based on the information.

As described above in the first case, the second base station 200, for example, transmits data destined for a terminal apparatus that accesses the first base station 100 to the terminal apparatus using the frequency band that is available to the first base station 100 with priority (i.e., the frequency band that the second base station 200 is incapable of using with priority). Accordingly, the second base station 200 can transmit the data to the terminal apparatus, for example, without a burden of radio resources.

5.2. Second Case

In a second case, the second base station 200 transmits data destined for the terminal apparatus that accesses the first base station 100 to the terminal apparatus using another frequency band that is available to the second base station 200. The other frequency band is a band different from the frequency band that is available to the first base station 100 with priority.

(Operation of First Base Station 100)

(a) Request for Transmission of Data

The first base station 100 (the control unit 153), for example, requests that the second base station 200 transmit the data to the terminal apparatus using another frequency band available to the second base station 200.

Referring to FIGS. 3, 5, and 7 again, the other frequency band is the frequency band 33 as an example. That is, the second base station 200 uses the frequency band 33 to transmit the data to the terminal apparatus. Note that the other frequency band is not limited thereto, and can be another arbitrary frequency band available to the second base station 200.

(b) Permission to Use Frequency Band

In the second case, the first base station 100 (the control unit 153) may not permit the second base station 200 to use the frequency band that is available to the first base station 100 with priority.

(c) Instruction on Use of SCC

The first base station 100 (the control unit 153), for example, instructs the terminal apparatus to use a band used by the second base station 200 for the transmission of the data as an SCC accompanied by a PCC used by the first base station 100. There is no difference in description of the specific process thereof between the above-described first case and the second case. Thus, overlapping description will be omitted here.

Accordingly, the second base station 200 can transmit the data to the terminal apparatus, for example, without handover of the terminal apparatus.

Note that, in the second case, the band used by the second base station 200 for the transmission of the data is the other frequency band available to the second base station 200. The first base station 100 may have known the other frequency band, or the second base station 200 may notify the first base station 100 of it.

(d) Transmission of Scheduling Information

The first base station 100 (the control unit 153), for example, transmits scheduling information indicating a result of scheduling for transmission of the data by the second base station 200 to the terminal apparatus.

Specifically, the second base station 200, for example, performs the scheduling to transmit the scheduling information to the first base station 100 as will be described below. Then, the first base station 100 (the control unit 153) transmits the scheduling information to the terminal apparatus. The first base station 100, for example, uses the frequency band that the first base station 100 uses (for example, a PCC of the terminal apparatus) for radio communication with the terminal apparatus to transmit the scheduling information to the terminal apparatus. The first base station 100 transmits the scheduling information to the terminal apparatus on, for example, a control channel (for example, a PDCCH).

Note that the first base station 100 may perform the scheduling instead of the second base station 200 performing the scheduling. In addition, the second base station 200 may transmit the scheduling information to the terminal apparatus instead of the first base station 100 transmitting the scheduling information to the terminal apparatus.

(Operation of Second Base Station 200)

(a) Transmission of Data

The second base station 200 uses the other frequency band available to the second base station 200 to transmit the data to the terminal apparatus. For example, the control unit 253 of the second base station 200 controls radio communication of the second base station 200 so that the second base station 200 transmits the data to the terminal apparatus using the other frequency band.

Specific Process

The control unit 253, for example, performs scheduling for transmitting the data. That is, the control unit 253 allocates radio resources of the other frequency band to a signal of the data. Then, the control unit 253 maps the signal of the data to the allocated radio resources.

Note that the first base station 100 may perform the scheduling instead of the second base station 200 performing the scheduling.

(b) Use of Frequency Band as SCC

The second base station 200, for example, uses a band for transmission of the data as an SCC accompanied by a PCC used by the first base station 100. For example, the control unit 253 controls radio communication of the second base station 200 so that the second base station 200 uses the band as the SCC.

Accordingly, the second base station 200 can transmit the data to the terminal apparatus, for example, without handover of the terminal apparatus.

Note that, in the second case, the band used by the second base station 200 for transmission of the data is the other frequency band available to the second base station 200.

(c) Transmission of Scheduling Information

The second base station 200 (the control unit 253), for example, transmits scheduling information indicating a result of the scheduling to the first base station 100. Then, the first base station 100 transmits the scheduling information to the terminal apparatus.

Note that the second base station 200 (the control unit 253) may transmit the scheduling information to the terminal apparatus instead of the first base station 100 transmitting the scheduling information to the terminal apparatus. The second base station 200 may transmit the scheduling information to the terminal apparatus on, for example, a control channel (for example, a PDCCH).

(Synchronization of First Base Station 100 and Second Base Station 200)

The first base station 100 and the second base station 200 may or may not be synchronized with each other.

As described above in the second case, the second base station 200, for example, uses another frequency band available to the second base station 200 to transmit data destined for the terminal apparatus that accesses the first base station 100 to the terminal apparatus. Accordingly, for example, the frequency band available to the first base station 100 with priority can be secured for the first base station 100. That is, a reduction of the band available to the first base station 100 is avoided. In addition, the second base station 200 can transmit the data to the terminal apparatus, regardless of a situation in which the first base station 100 uses the frequency band available to the first base station 100 with priority.

5.4. Third Case

In a third case, the second base station 200 transmits the data to the terminal apparatus using at least one selected from the frequency band available to the first base station 100 with priority and another frequency band available to the second base station 200.

(Operation of First Base Station 100)

The first base station 100 (the control unit 153), for example, requests that the second base station 200 transmit the data to the terminal apparatus using at least one selected from the frequency band available to the first base station 100 with priority and another frequency band available to the second base station 200.

When the frequency band available to the first base station 100 with priority is selected, the first base station 100 operates as in the above-described first case.

When the other frequency band available to the second base station 200 is selected, the first base station 100 operates as in the above-described second case.

When both the frequency band and the other frequency band are selected, the first base station 100 performs both the operation of the above-described first case and the above-described second operation. Note that the operation of the above-described first case and the above-described second operation may be performed separately, or may be appropriately performed in an integrated manner.

Note that the first base station 100 (the control unit 153), for example, selects at least one of the frequency band and the other frequency band.

(Operation of Second Base Station 200)

The second base station 200 transmits the data to the terminal apparatus using at least one selected from the frequency band and the other frequency band. For example, the control unit 253 of the second base station 200 controls radio communication of the second base station 200 so that the second base station transmits the data to the terminal apparatus using the selected one.

When the frequency band available to the first base station 100 with priority is selected, the second base station 200 operates as in the above-described first case.

When the other frequency band available to the second base station 200 is selected, the second base station 200 operates as in the above-described second case.

When both the frequency band and the other frequency band are selected, the second base station 200 performs both the operation of the above-described first case and the above-described second operation. Note that the operation of the above-described first case and the above-described second operation may be performed separately, or may be appropriately performed in an integrated manner.

(Synchronization of First Base Station 100 and Second Base Station 200)

The first base station 100 and the second base station 200 are, for example, synchronized with each other. There is no difference in this point between the above-described first case and third case. Thus, overlapping description will be omitted here.

(Selection of at Least One Band)

An example in which at least one is selected from the frequency band (i.e., the frequency band available to the first base station 100 with priority) and the other frequency band (i.e., the other frequency band available to the second base station 200) will be described.

(First Example)

As a first example, when there is another frequency band available to the second base station 200, the other frequency band is selected, and when there is no other frequency band, the foregoing frequency band is selected.

When there is the frequency band 33 as in the example shown in FIGS. 3, 5, and 7, for example, the other frequency band is selected. The other frequency band is of course not limited to the example, and can be another arbitrary frequency band available to the second base station 200.

Note that, when there is the other frequency band, the foregoing frequency band may also be selected in addition to the other frequency band.

Accordingly, for example, it is possible to secure the frequency band available to the first base station 100 with priority for the first base station 100 as much as possible.

That is, a reduction of the band available to the first base station 100 is avoided as much as possible.

(Second Example)

As a second example, at least one selected from the frequency band and the other frequency band may be selected based on an amount or a ratio of radio resources (which is referred to as "remaining resources" below) available to the second base station 200 for transmission of the data among radio resources of the other frequency band.

When, for example, the amount or the ratio of the remaining resources is great (for example, the amount or the ratio of the remaining resources is equal to or greater than a first threshold value), the other frequency band is selected and the frequency band is not selected.

In addition, when the amount or the ratio of the remaining resources is small (for example, the amount or the ratio of the remaining resources is smaller than the first threshold value), for example, both the frequency band and the other frequency band are selected.

Note that, when the amount or the ratio of the remaining resources is small (for example, the amount or the ratio of the remaining resources is smaller than the first threshold value), only the foregoing frequency band may be selected. Alternatively, when the amount or the ratio of the remaining resources is very small (for example, the amount or the ratio of the remaining resources is smaller than a second threshold value (a threshold value smaller than the first threshold value)), only the foregoing frequency band may be selected.

Accordingly, for example, it is possible to secure the frequency band available to the first base station 100 with priority for the first base station 100 as much as possible. That is, a reduction of the band available to the first base station 100 is avoided as much as possible.

Furthermore, when at least the frequency band is selected, an amount of radio resources used by the second base station 200 among radio resources of the frequency band (for example, a period or a band) may be decided based on the amount or the ratio of the remaining resources. When the amount is larger or the ratio is greater, for example, the amount of the radio resources used by the second base station 200 among the radio resources of the frequency band may be smaller (for example, the period may be shorter or the band may be narrower). When the amount is less or the ratio is smaller, for example, the amount of the radio resources used by the second base station 200 among the radio resources of the frequency band may be larger (for example, the period may be longer or the band may be wider). Accordingly, for example, a reduction of interference and leveling of traffic are expected.

Note that the amount or the ratio of the remaining resources may be computed by the second base station 200 (the control unit 253), and the second base station 200 (the control unit 253) may notify the first base station 100 of it. Alternatively, the amount or the ratio of the remaining resources may be computed by the first base station 100 (the control unit 153) based on information provided by the second base station 200 (for example, scheduling information with regard to the other frequency band).

6. CONSIDERATION OF ANOTHER RADIO COMMUNICATION SYSTEM HAVING HIGHER PRIORITY LEVEL

Next, an operation of the first base station 100 and the second base station 200 taking another radio communication system having a higher priority level (i.e., the third radio communication system) into consideration will be described.

As described above, the frequency band is, for example, a band used by another radio communication system (i.e., the third radio communication system) with higher priority than the radio communication system that includes the first base station 100 (i.e., the first radio communication system). In this case, the first base station 100 can use the frequency band under the condition that interference with the third radio communication system be avoided or suppressed.

(Use of Frequency Band by First Base Station)

(a) First Example

As a first example, the first base station 100 can use the frequency band when reception power of the first base station 100 with respect to a signal transmitted from the third radio communication system using the frequency band is equal to or lower than a threshold value.

The first base station 100 (for example, the processing unit 150), for example, measures reception power with respect to the signal transmitted from the third radio communication system using the frequency band. Then, the processing unit 150 (for example, the control unit 153) determines whether the reception power is equal to or lower than the threshold value. Then, when the reception power is equal to or lower than the threshold value, the control unit 153 controls radio communication of the first base station 100 so that the first base station 100 transmits a signal using the frequency band.

Accordingly, for example, interference in the third radio communication system is suppressed.

(b) Second Example

As a second example, the first base station 100 may be capable of using the frequency band when the first base station 100 is positioned at a place at which the first base station 100 can suppress interference with the third radio communication system to a tolerable level.

When the first base station 100 is positioned outside an exclusive zone of the third radio communication system, for example, the first base station 100 may be capable of using the frequency band. The exclusive zone is an area in which there is a possibility of a signal transmitted with arbitrary transmission power interfering with the third radio communication system to an extent exceeding the tolerable level.

Specifically, for example, a frequency management system that manages use of a frequency band acquires position information indicating a position of the first base station 100 and determines whether the position is included in the exclusive zone. Then, the frequency management system notifies the first base station 100 of the result of the determination. Then, when the position is not included in the exclusive zone, the control unit 153 controls radio communication of the first base station 100 so that the first base station 100 transmits signals using the frequency band. Note that, in place of the frequency management system, the first base station 100 may determine whether the position of the first base station 100 is included in the exclusive zone by itself. In addition, when the position is not included in the exclusive zone, the frequency management system may transmit information regarding an available frequency band to the first base station 100 instead of notifying the first base station 100 of the result of the determination. The information regarding an available frequency band may include information indicating the frequency band, information indicating maximum transmission power of the frequency band, information indicating a period in which the frequency band is available, and the like.

Accordingly, interference in the third radio communication system, for example, is suppressed.

(c) Third Example

As a third example, the first base station 100 may be capable of using the frequency band in a period in which the third radio communication system does not use the frequency band. As described above, the frequency band may be a part of a band used by the third radio communication system or the whole of a band used by the third radio communication system.

A frequency management system that manages the frequency band or the third radio communication system, for example, may notify the first base station 100 of the period. Then, the control unit 153 may control radio communication of the first base station 100 so that the first base station 100 transmits a signal using the frequency band in the period.

(Use of Frequency Band by Second Base Station)

(a) Frequency Band Available to First Base Station 100 with Priority

The second base station 200, for example, can use, albeit no priority provided, the frequency band available to the first base station 100 with priority. In this case, the second base station 200 can use the frequency band under the condition that, for example, interference with the first base station 100 (or the first radio communication system) and the third radio communication system be avoided or suppressed.

The second base station 200, for example, can use a part or the whole of the frequency band in a period in which both the first base station 100 (or the first radio communication system) and the third radio communication system do not use the part or the whole of the frequency band.

For example, the first base station 100 or another network node (for example, a frequency management system that manages the frequency band) notifies the second base station 200 of the period. Then, the second base station 200 uses the part or the whole of the frequency band in the period to transmit or receive signals.

(b) Other Frequency Band Available to Second Base Station 200

Note that another frequency band available to the second base station 200 may be a band used by the third radio communication system with priority. In this case, the second base station 200 can use the other frequency band under the condition that interference with the third radio communication system be avoided or suppressed, like the first base station 100.

Note that there is no difference in description regarding techniques for avoiding or suppressing interference in the third radio communication system between the technique of the above-described first base station 100 (the control unit 153) and the technique of the second base station 200 (the control unit 253) except for the difference in the target bands.

(Permission for First Base Station to Use Frequency Band)

When requesting that the second base station 200 transmit the data destined for the terminal apparatus to the terminal apparatus using the frequency band, for example, the first base station 100 (the control unit 153) permits the second base station 200 to use the frequency band as described above.

In addition, the second base station 200, for example, may be incapable of using the frequency band without permission as described above. In this case, the first base station 100 (the control unit 153) may permit the second base station 200 to use a part or the whole of the frequency band.

The control unit 153 of the first base station 100, for example, permits the second base station 200 to use the frequency band within a range within which the first base station 100 can use the frequency band. As an example, the control unit 153 permits the second base station 200 to use a part or the whole of the frequency band in a period in which the first base station 100 can use the frequency band.

Accordingly, for example, interference of the second base station 200 with the third radio communication system is avoided or suppressed.

7. PROCESS FLOW

Figure 10:
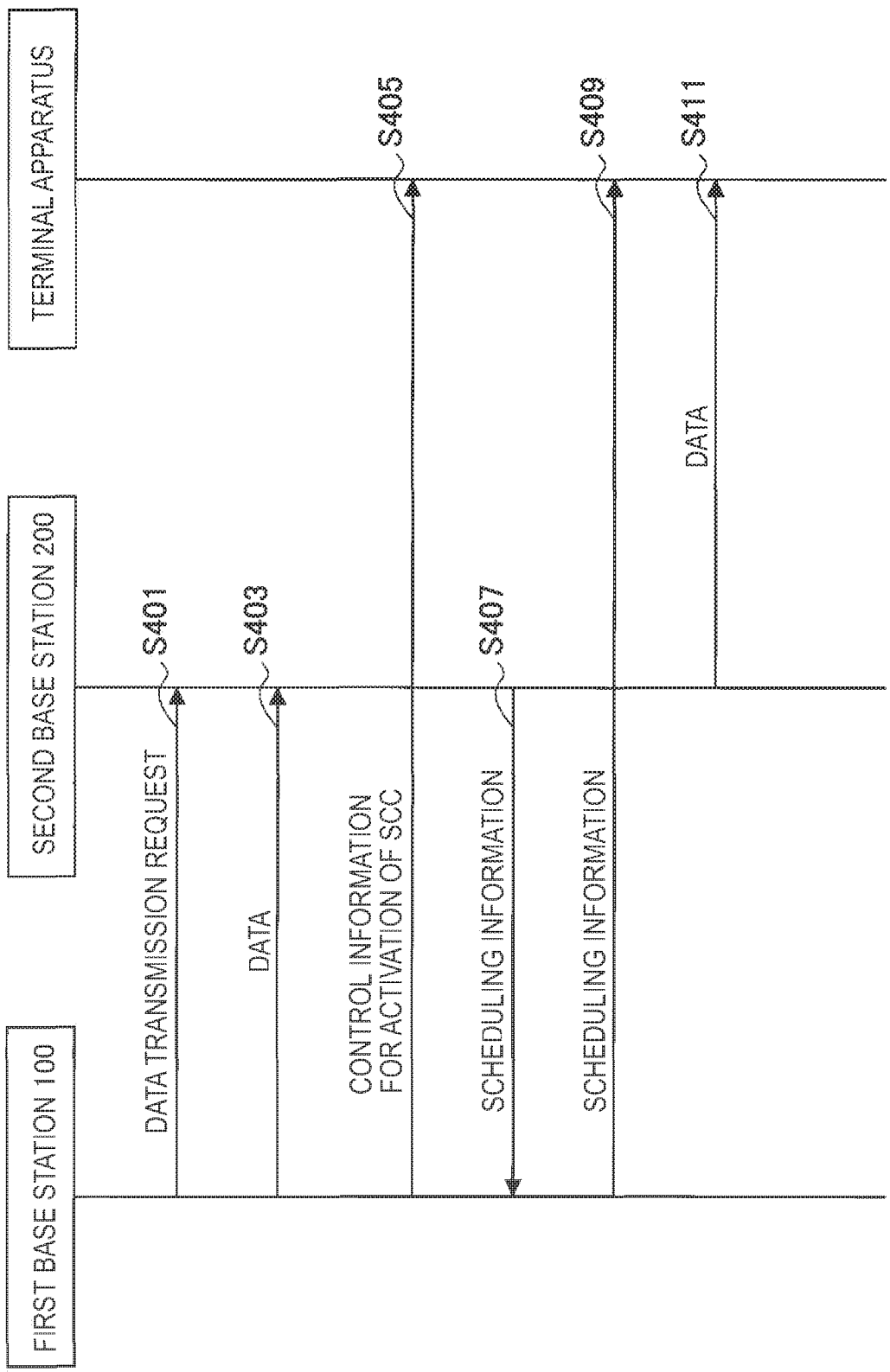
FIG. 10 is a sequence diagram showing an example of a schematic flow of a process according to the embodiment.

Next, an example of a process according to the embodiment of the present disclosure will be described with reference to FIG. 10. FIG. 10 is a sequence diagram showing an example of a schematic flow of the process according to the embodiment of the present disclosure.

The first base station 100 acquires information regarding the second base station 200, and requests that the second base station 200 transmit data destined for a terminal apparatus that accesses the first base station 100 to the terminal apparatus (S401).

In addition, the first base station 100 forwards the data destined for the terminal apparatus to the second base station 200 (S403).

In addition, the first base station 100 transmits control information for activating an SCC (for example, an RRC connection configuration message, or an MAC control element) to the terminal apparatus (S405).

The second base station 200 performs scheduling for transmission of the data and transmits scheduling information indicating the result of the scheduling to the first base station 100 (S407).

The first base station 100 transmits the scheduling information to the terminal apparatus (S409). Then, the second base station 200 transmits the data to the terminal apparatus (S411).

8. MODIFIED EXAMPLES

Next, a first modified example and a second modified example of the embodiment of the present disclosure will be described.

8.1. First Modified Example

In a first modified example of the embodiment of the present disclosure, the first base station 100 (the control unit 153) gives an instruction to the second base station 200 with regard to a link direction for a band used by the second base station 200 to transmit the data to the terminal apparatus that accesses the first base station 100 (which will be referred to as a "link direction-related instruction" hereinbelow).

On the other hand, the second base station 200 performs radio communication using the band according to the link direction-related instruction. The control unit 253 of the second base station 200 controls radio communication of the second base station 200 according to the link direction-related instruction.

(Band)

The band is, for example, the frequency band available to the first base station 100 with priority (i.e., the band that the second base station 200 is incapable of using with priority). Note that the band may be the other frequency band available to the second base station 200.

Note that, when the band is the frequency band available to the first base station 100 with priority, the link direction-related instruction is given, for example, with activation of the frequency band as an SCC.

(Link Direction-Related Instruction)

(a) Instruction of Duplex Scheme

The link direction-related instruction includes, for example, an instruction on a duplex scheme applied to the band. That is, the first base station 100 gives the instruction on the duplex scheme applied to the band, and the second base station 200 performs radio communication using the band according to the duplex scheme.

The duplex scheme is, for example, time division duplex (TDD) or frequency division duplex (FDD).

Accordingly, the first base station 100, for example, can cause the second base station 200 to change a duplex scheme to be used when necessary.

(b) TDD: Instruction of TDD Configuration

A duplex scheme applied to the band is, for example, TDD. In this case, the link direction-related instruction includes, for example, an instruction of a TDD configuration applied to the band. That is, the first base station 100 gives the instruction of the TDD configuration applied to the band, and the second base station 200 performs radio communication using the band according to the TDD configuration.

The TDD configuration indicates a link direction in units of subframes of a radio frame. In other words, the TDD configuration indicates whether each subframe included in the radio frame is a downlink subframe, an uplink subframe, or a special subframe. Note that the TDD configuration is also called an uplink-downlink configuration or a TDD uplink-downlink configuration.

Note that, when the second base station 200 performs radio communication using a plurality of frequency bands (for example, when the base station performs radio communication using a plurality of component carriers (CCs)), different duplex schemes may be applied to at least two frequency bands of the plurality of frequency bands. For example, TDD may be applied to one frequency band and FDD to the other frequency band.

(b-1) Instruction of Existing TDD Configuration

The TDD configuration applied to the band is, for example, one of 7 existing TDD configurations. With regard to the 7 existing TDD configurations, the 7 existing TDD configurations defined in the technical standard of the 3$^{rd}$ Generation Partnership Project (3GPP) (TS 36.211 Table 4.2-2: Uplink-downlink Configuration) will be described with reference to FIG. 11.

FIG. 11 is an illustrative diagram for describing the 7 existing TDD configurations. Referring to FIG. 11, the 7 existing TDD configurations are shown. In the TDD configurations, each subframe is one among a downlink frame that is a subframe for downlink, an uplink frame that is a subframe for uplink, and a special subframe. A special subframe is provided when a downlink subframe and an uplink subframe are switched in order to consider a delay of propagation from a base station to a terminal apparatus.

Note that the first base station 100 (the control unit 153) may give an instruction of a TDD configuration to be applied to the band by giving a notification of the configuration number (0 to 6) of the TDD configuration.

Accordingly, when TDD is employed, for example, it is possible to change a ratio of uplink subframes and downlink subframes as necessary. For example, more radio resources can be allocated to transmit signals in downlink.

(b-2) Instruction of New TDD Configuration

The TDD configuration may be a TDD configuration other than the existing TDD configurations shown in FIG. 11. The TDD configuration may be, for example, a TDD configuration in which all subframes are downlink subframes (which will be referred to as a "downlink-dedicated configuration" below). That is, the link direction-related instruction may include an instruction of a downlink-dedicated configuration. The TDD configuration will be described below with reference to FIG. 12.

Figure 12:
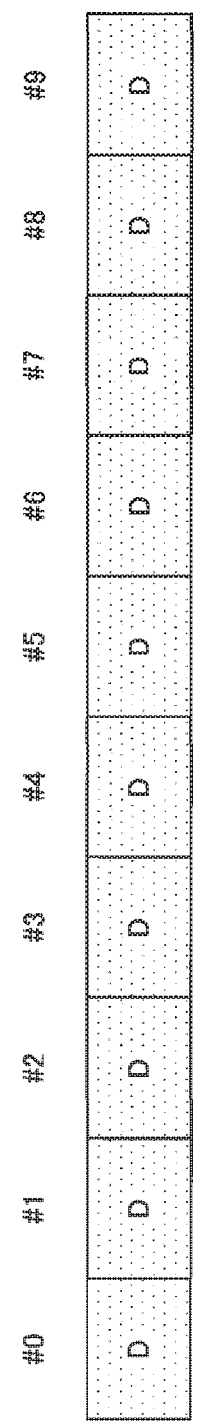
FIG. 12 is an illustrative diagram for describing a downlink-dedicated configuration.

FIG. 12 is an illustrative diagram for describing the downlink-dedicated configuration. Referring to FIG. 12, the downlink-dedicated TDD configuration is shown. As shown in FIG. 12, all subframes in the downlink-dedicated TDD configuration are downlink subframes.

Accordingly, even when TDD is employed, for example, all radio resources can be used for transmission of a signal in downlink. In addition, this downlink-dedicated TDD configuration may be applied to a downlink SCC accompanied by a PCC used by the first base station 100 that operates in FDD.

Note that, when the second base station 200 performs radio communication using a plurality of frequency bands (for example, a plurality of CCs), different TDD configurations may be applied to at least two frequency bands of the plurality of frequency bands.

(c) FDD: Instruction of Link Direction of Frequency Band

The duplex scheme applied to the band is, for example, FDD. In this case, the link direction-related instruction includes, for example, an instruction of use of the band as a downlink band. That is, the first base station 100 gives the instruction of use of the band as a downlink band, and the second base station 200 performs radio communication using the band serving as a downlink band.

Note that the link direction-related instruction may include an instruction of use of the band as an uplink band instead of the instruction of use of the band as a downlink band. That is, the first base station 100 may give the instruction of use of the band as an uplink band, and the second base station 200 may perform radio communication using the band serving as an uplink band.

(Specific Process)

(a) Link Direction-Related Instruction

The first base station 100 (the control unit 153) transmits control information for giving the link direction-related instruction (for example, a message, a command, or the like) to the second base station 200. Then, the second base station 200 (the control unit 253) performs radio communication using the band according to the control information.

Note that, when the first base station 100 requests that the second base station 200 transmit the data destined for the terminal apparatus that accesses the first base station 100 to the terminal apparatus, the control information may be control information for giving the link direction-related instruction, and may be control information for requesting that the data be transmitted to the terminal apparatus.

(b) Transmission of Data

When TDD is applied, for example, the control unit 253 of the second base station 200 allocates radio resources of downlink subframes to a signal of the data destined for the terminal apparatus and maps the signal to the radio resources.

When FDD is applied, for example, the control unit 253 of the second base station 200 allocates radio resources of a downlink band to the signal of the data destined for the terminal apparatus and maps the signal to the radio resources.

8.2. Second Modified Example

In the examples described above according to the embodiment of the present disclosure, the first base station 100 makes a request (i.e., request that the data destined for the terminal apparatus be transmitted) and permits use of a frequency band with respect to the second base station 200.

In a second modified example of the embodiment of the present disclosure, for example, another network node, instead of the first base station 100, may make a request (i.e., a request that the data destined for a terminal apparatus be transmitted) and permit use of a frequency band with respect to the second base station 200. As an example, the other network node may be a frequency management system that manages frequency bands.

More specifically, at least one of the information acquisition unit 151 and the control unit 153 may be provided in the other network node. In addition, the rest of the information acquisition unit 151 and the control unit 153 may be provided in the first base station 100.

9. OTHER EMBODIMENT

Next, another embodiment of the present disclosure will be described.

(Technical Problem)

For off-loading of traffic, for example, a radio communication apparatus that is not connected to wired backhaul (for example, a terminal apparatus which can operate as a base station, a base station simply not connected to wired backhaul, or the like) can operate as a base station (for example, a base station of a small cell). In this case, the radio communication apparatus can use radio backhaul between the radio communication apparatus and another base station (for example, a base station of a macrocell).

However, if it is not possible to secure a frequency band to be used for radio backhaul, it is not possible to transmit and receive data via the radio backhaul from the beginning. In addition, if it is not possible to secure a sufficient frequency band to be used for radio backhaul, there is a possibility of a delay occurring in the radio backhaul, and as a result, a communication speed in the coverage of the radio communication apparatus can be lowered.

Thus, it is desirable to provide a mechanism which enables transmission and reception of data via radio backhaul with satisfactory efficiency.

(Technical Features)

The first base station 100 (the information acquisition unit 151), for example, acquires information regarding the second base station 200 having a coverage area that overlaps a coverage area of the first base station 100. Then, the first base station 100 (the control unit 153) requests that the second base station 200 transmit or receive data transmitted and received between the second base station 200 and a terminal apparatus that accesses the second base station 200 via radio backhaul that is radio backhaul between the first base station 100 and the second base station 200 and that uses a frequency band available to the second base station 200.

(a) Second Base Station 200

Base Station Not Connected to Radio Backhaul

The second base station 200 is, for example, a base station that is not connected to radio backhaul. The second base station 200 may be a terminal apparatus operable as a base station, or just a base station that is not connected to wired backhaul.

Information Regarding Second Base Station 200

The information regarding the second base station 200 includes, for example, identification information of the second base station 200 (for example, a cell ID), an address of the second base station 200 (for example, an IP address), position information indicating a position of the second base station 200, and/or a measurement result on the second base station 200 obtained by a terminal apparatus.

The information regarding the second base station 200 is, for example, stored in the storage unit 140, and the information acquisition unit 151 acquires the information from the storage unit 140.

(b) Radio Backhaul

As described above, the radio backhaul between the first base station 100 and the second base station 200 is radio backhaul that uses the frequency band available to the second base station 200.

Frequency Band

Specific Example

The frequency band available to the second base station 200 is, for example, "another frequency band" according to the embodiment described before the other embodiment. More specifically, the frequency band available to the second base station 200 is, for example, the frequency band 33 shown in FIG. 3, 5, or 7.

Permission

The frequency band is, for example, a frequency band of which use for the radio backhaul is permitted. The frequency band may be a frequency band that is already permitted before a request, or may be a frequency band permitted after a request.

The second base station 200 permits the frequency band to be used for the radio backhaul.

The frequency band is permitted to be used for the radio backhaul in a period in which the second base station 200 does not use the frequency band for communication with a terminal apparatus.

Additional Frequency Band

The radio backhaul may be radio backhaul that uses an additional frequency band as well as the frequency band. The additional frequency band may be a frequency band available to the first base station 100. More specifically, the additional frequency band may be the frequency band 31 shown in one of FIGS. 2 to 7. In addition, when the first base station 100 is managed by a communication service provider assigned with a licensed frequency band, the additional frequency band may be the licensed frequency band.

(c) Specific Process

The control unit 153, for example, transmits control information for a request to the second base station 200 (for example, a message, a command, or the like) to the second base station 200 via the radio communication unit 120.

Note that the control unit 153, for example, transmits the data to the second base station 200 and receives the data from the second base station 200 via the radio communication unit 120.

(Process Flow)

Figure 13:
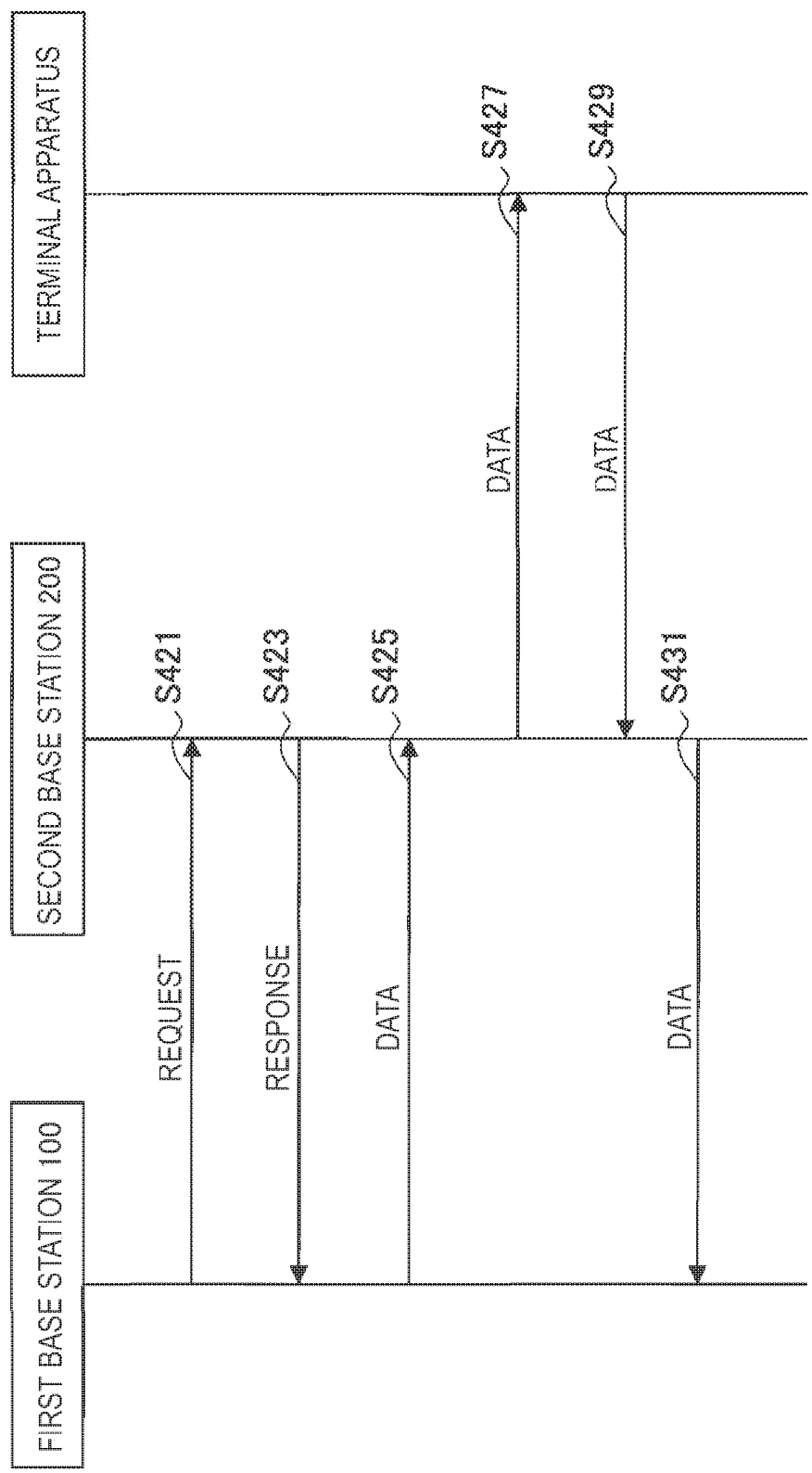
FIG. 13 is a sequence diagram showing an example of a schematic flow of a process according to another embodiment.

FIG. 13 is a sequence diagram showing an example of a schematic flow of a process according to another embodiment of the present disclosure.

The first base station 100 acquires information regarding the second base station 200. Then, the first base station 100 requests that the second base station 200 transmit or receive data transmitted and received between the second base station 200 and a terminal apparatus that accesses the second base station 200 via radio backhaul that is radio backhaul between the first base station 100 and the second base station 200 and uses a frequency band available to the second base station 200 (S421). The frequency band may have already been permitted to be used for the radio backhaul, or may be permitted to be used for the radio backhaul after this request.

Then, the second base station 200 responds to the first base station 100 (S423).

Then, upon receiving data destined for the terminal apparatus that accesses the second base station 200 from a network, the first base station 100 forwards the data to the second base station 200 via the radio backhaul (S425). Then, the second base station 200 transmits the data to the terminal apparatus (S427).

In addition, the terminal apparatus that accesses the second base station 200 transmits data to the second base station 200 (S429), and the second base station 200 transmits the data to the first base station 100 via the radio backhaul (S423). Note that the first base station 100 forwards the data to the network.

(Modified Example)

In the example described above, the first base station 100 requests the second base station 200 to transmit or receive the data via the radio backhaul. However, the other embodiment is not limited thereto.

As a first modified example, a network node (an information acquisition unit) different from the first base station 100 and the second base station 200 may acquire information regarding the second base station 200. Then, the network node (a control unit) may request one of or both the first base station 100 and the second base station 200 to transmit or receive the data via the radio backhaul. As a result, the first base station 100 and the second base station 200 may transmit and receive the data via the radio backhaul.

As a second modified example, the second base station 200 (the information acquisition unit 251) may acquire information regarding the second base station 200. Then, the second base station 200 (the control unit 253) may request the first base station 100 to transmit or receive the data via the radio backhaul. As a result, the first base station 100 and the second base station 200 may transmit and receive the data via the radio backhaul.

10. APPLICATION EXAMPLES

The technology of the present disclosure is applicable to various products. For example, a base station according to an embodiment of the present disclosure (for example, the first base station 100 and the second base station 200) may be realized as any type of evolved Node B (eNB) such as a macro eNB, and a small eNB. A small eNB may be an eNB that covers a cell smaller than a macrocell, such as a pico eNB, a micro eNB, or a home (femto) eNB. Instead, the base station may be realized as another type of base station such as a NodeB or a base transceiver station (BTS). The base station may include a main body (that is also referred to as a base station apparatus) configured to control radio communication, and one or more remote radio heads (RRH) disposed in a different place from the main body. Additionally, various types of terminals to be described below may also operate as the base station by temporarily or semi-permanently executing a base station function. Furthermore, at least a part of constituent elements of the base station may be realized in a base station apparatus or a module for a base station apparatus.

In addition, the other network node according to the second modified example may be realized as any type of server, for example, a tower server, a rack server, or a blade server. In addition, at least a part of constituent elements of the other network node may be realized in a module (for example, an integrated circuit module configured in one die, or a card or a blade inserted into a slot of a blade server) mounted in a server.

For example, the second base station 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The second base station 200 may also be realized as a terminal (that is also referred to as a machine type communication (MTC) terminal) that performs machine-to-machine (M2M) communication. Furthermore, at least a part of constituent elements of the second base station 200 may be realized in a module (such as an integrated circuit module configured in one die) mounted on each of the terminals.

10.1. Application Example Regarding Other Network Node

Figure 14:
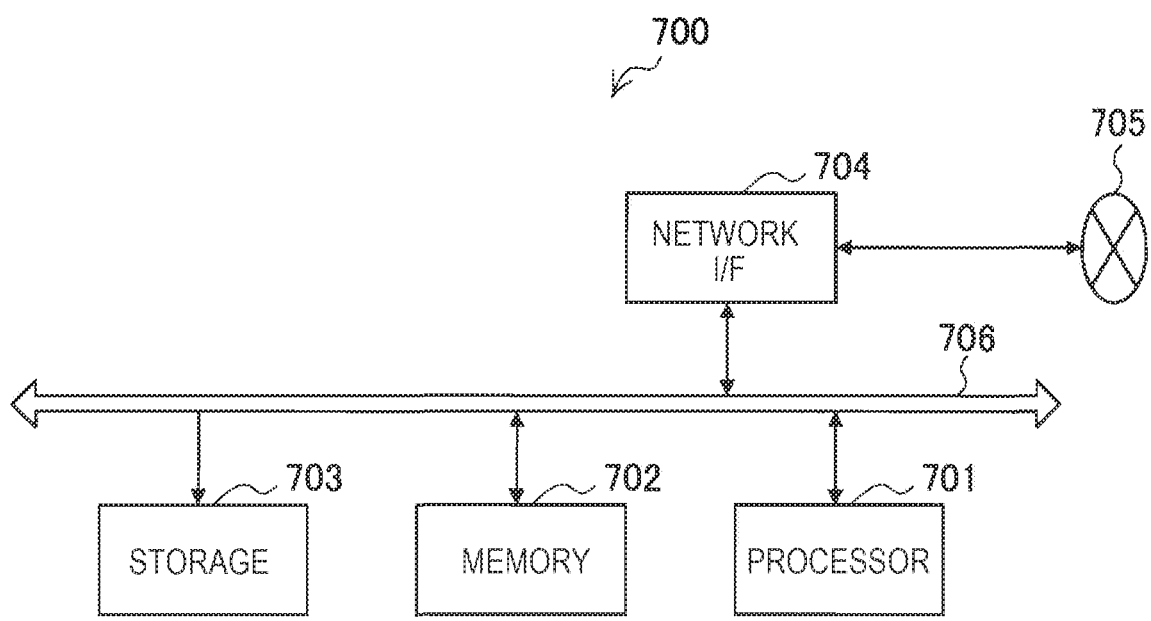
FIG. 14 is a block diagram showing an example of a schematic configuration of a server.

FIG. 14 is a block diagram showing an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes a random access memory (RAM) and a read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

At least a part of constituent elements (for example, the information acquisition unit 151 and/or the control unit 153) included in the processing unit 150 described with reference to FIG. 8 may be implemented by the processor 701 of the server 700 shown in FIG. 14. As an example, a program for causing the processor to function as the at least part (i.e., a program for causing the processor to execute operations of the at least part) may be installed in the server 700, and the processor 701 may execute the program. As another example, the server 700 may have a module that includes the processor 701 and the memory 702 to implement the at least part in the module. In this case, the module may store a program for causing the processor to function as the at least part in the memory 702, and the processor 701 may execute the program. As described above, the server 700 or the module may be provided as an apparatus that includes the at least part, or the program for causing the processor to function as the at least part may be provided. In addition, a readable recording medium on which the program is recorded may be provided.

10.2. Application Examples Regarding First Base Station and Second Base Station (First Application Example)

Figure 15:
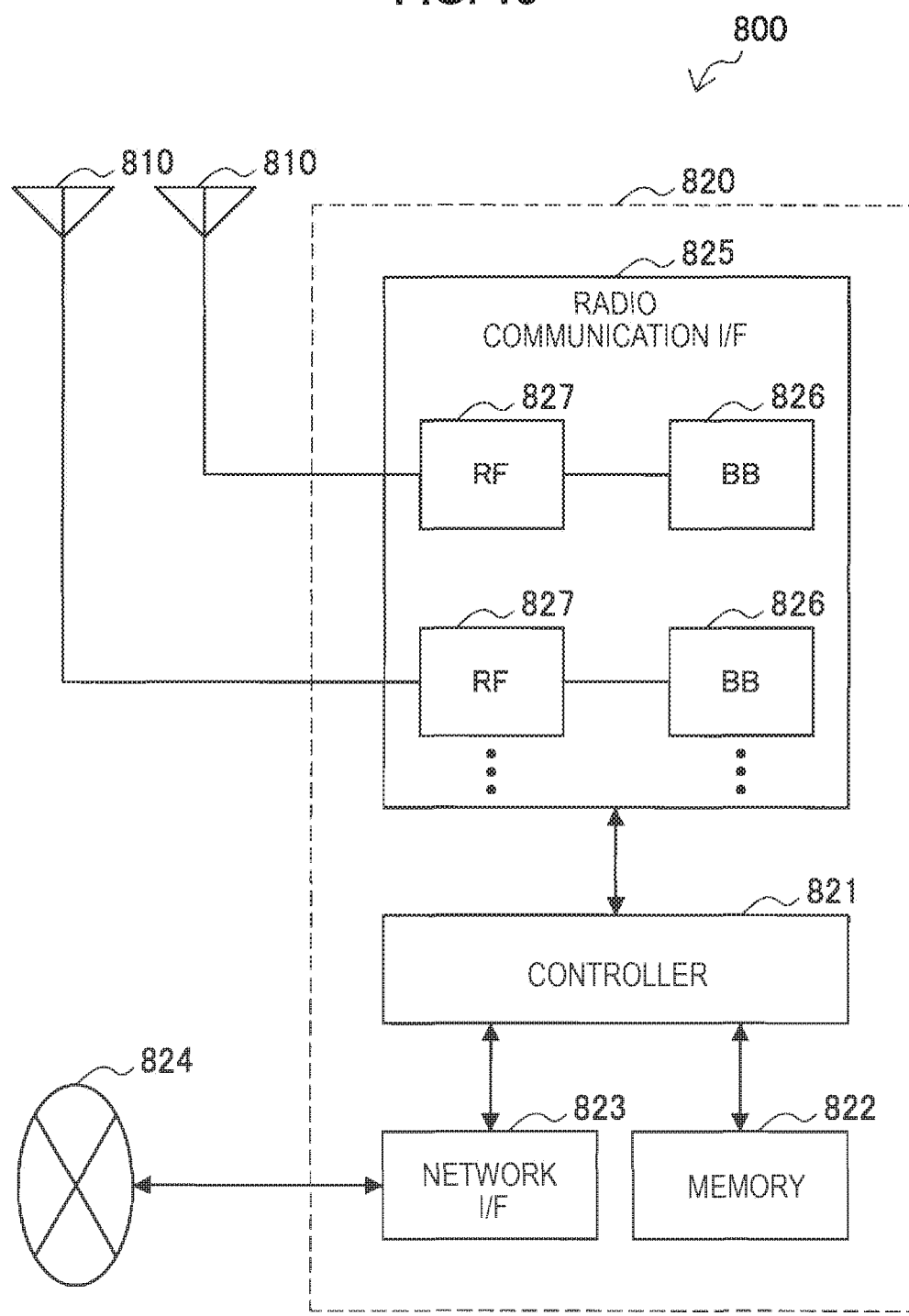
FIG. 15 is a block diagram showing a first example of a schematic configuration of an eNB.

FIG. 15 is a block diagram showing a first example of a schematic configuration of an eNB to which the technology of the present disclosure may be applied. The eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in a MIMO antenna), and is used for the base station apparatus 820 to transmit and receive radio signals. The eNB 800 may include the multiple antennas 810, as illustrated in FIG. 15. For example, the multiple antennas 810 may be compatible with multiple frequency bands used by the eNB 800. Although FIG. 15 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple baseband processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes a RAM and a ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an Si interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides wireless connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 15. For example, the multiple BB processors 826 may be compatible with multiple frequency bands used by the eNB 800. The radio communication interface 825 may include the multiple RF circuits 827, as illustrated in FIG. 15. For example, the multiple RF circuits 827 may be compatible with multiple antenna elements. Although FIG. 15 illustrates the example in which the radio communication interface 825 includes the multiple BB processors 826 and the multiple RF circuits 827, the radio communication interface 825 may also include a single BB processor 826 or a single RF circuit 827.

At least a part of the constituent elements included in the processing unit 150 (for example, the information acquisition unit 151 and/or the control unit 153) described with reference to FIG. 8 may be implemented by the radio communication interface 825 of the eNB 800 shown in FIG. 15. Alternatively, the at least part of the elements may be implemented by the controller 821. As an example, the eNB 800 may have a module that includes a part or all of the radio communication interface 825 (for example, the BB processors 826) and/or the controller 821, and the at least part may be implemented by the module. In this case, the module may store a program for causing a processor to function as the at least part (in other words, a program for causing a processor to execute operations of the at least part) and execute the program. As another example, a program for causing a processor to function as the at least part may be installed in the eNB 800 and the radio communication interface 825 (for example, the BB processors 826) and/or the controller 821 may execute the program. As described above, the eNB 800, the base station apparatus 820, or the module may be provided as an apparatus that includes the at least part, or a program for causing a processor to function as the at least part may be provided. In addition, a readable recording medium in which the program is recorded may be provided. With regard to these points, at least a part of the constituent elements included in the processing unit 250 (for example, the information acquisition unit 251 and/or the control unit 253) described with reference to FIG. 9 are similar to the at least part of the constituent elements included in the processing unit 150.

Furthermore, the radio communication unit 120 described with reference to FIG. 8 may be implemented by the radio communication interface 825 (for example, the RF circuit 827) in the eNB 800 shown in FIG. 15. In addition, the antenna unit 110 may be implemented by the antenna 810. Furthermore, the network communication unit 130 may be implemented by the controller 821 and/or the network interface 823. With regard to this points, the antenna unit 210, the radio communication unit 220, and the network communication unit 230 described with reference to FIG. 9 are similar to the antenna unit 110, the radio communication unit 120, and the network communication unit 130.

(Second Application Example)

Figure 16:
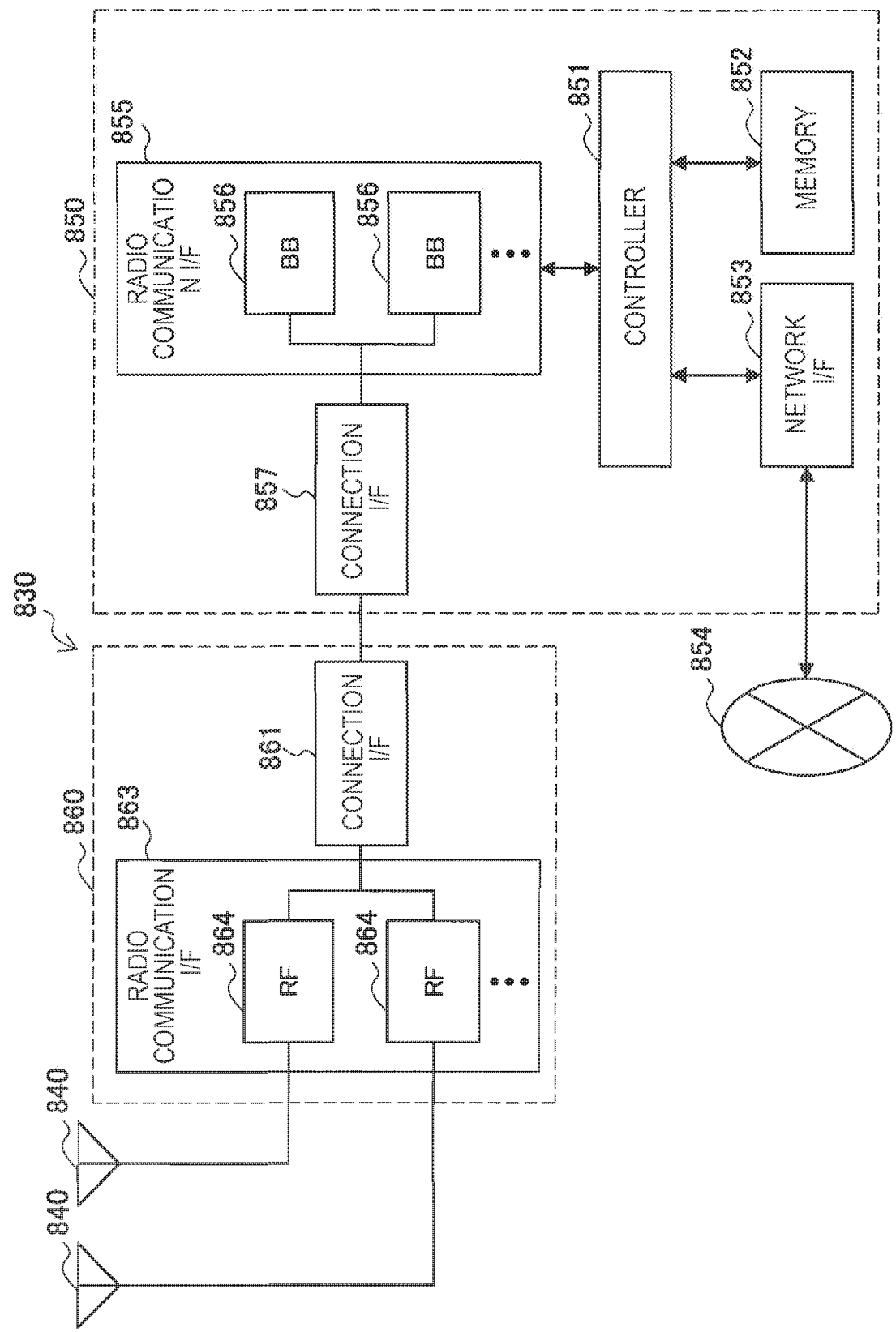
FIG. 16 is a block diagram showing a second example of a schematic configuration of an eNB.

FIG. 16 is a block diagram showing a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in a MIMO antenna), and is used for the RRH 860 to transmit and receive radio signals. The eNB 830 may include the multiple antennas 840, as illustrated in FIG. 16. For example, the multiple antennas 840 may be compatible with multiple frequency bands used by the eNB 830. Although FIG. 16 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processors 826 described with reference to FIG. 15, except the BB processors 856 are connected to RF circuits 864 of the RRH 860 via the connection interface 857. The radio communication interface 855 may include the multiple BB processors 856, as shown in FIG. 16. For example, the multiple BB processors 856 may be compatible with multiple frequency bands used by the eNB 830. Although FIG. 16 shows the example in which the radio communication interface 855 includes the multiple BB processors 856, the radio communication interface 855 may also include a single BB processor 856.

The connection interface 857 is an interface for connecting the base station apparatus 850 the (radio communication interface 855) to the RRH 860. The connection interface 857 may also be a communication module for communication in the above-described high speed line that connects the base station apparatus 850 (the radio communication interface 855) to the RRH 860.

The RRH 860 includes a connection interface 861 and a radio communication interface 863.

The connection interface 861 is an interface for connecting the RRH 860 (the radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as shown in FIG. 16. For example, the multiple RF circuits 864 may support multiple antenna elements. Although FIG. 16 illustrates the example in which the radio communication interface 863 includes the multiple RF circuits 864, the radio communication interface 863 may also include a single RF circuit 864.

At least a part of the constituent elements included in the processing unit 150 (for example, the information acquisition unit 151 and/or the control unit 153) described with reference to FIG. 8 may be implemented by the radio communication interface 855 and/or the radio communication interface 863 of the eNB 830 shown in FIG. 16. Alternatively, the at least part of the elements may be implemented by the controller 851. As an example, the eNB 830 may have a module that includes a part or all of the radio communication interface 855 (for example, the BB processors 856) and/or the controller 851, and the at least part may be implemented by the module. In this case, the module may store a program for causing a processor to function as the at least part (in other words, a program for causing a processor to execute operations of the at least part) and execute the program. As another example, a program for causing a processor to function as the at least part may be installed in the eNB 830 and the radio communication interface 855 (for example, the BB processors 856) and/or the controller 851 may execute the program. As described above, the eNB 830, the base station apparatus 850, or the module may be provided as an apparatus that includes the at least part, or a program for causing a processor to function as the at least part may be provided. In addition, a readable recording medium in which the program is recorded may be provided. With regard to these points, at least a part of the constituent elements included in the processing unit 250 (for example, the information acquisition unit 251 and/or the control unit 253) described with reference to FIG. 9 are similar to the at least part of the constituent elements included in the processing unit 150.

Furthermore, the radio communication unit 120 described, for example, with reference to FIG. 8 may be implemented by the radio communication interface 863 (for example, the RF circuit 864) in the eNB 830 shown in FIG. 16. In addition, the antenna unit 110 may be implemented by the antenna 840. Furthermore, the network communication unit 130 may be implemented by the controller 851 and/or the network interface 853. With regard to this points, the antenna unit 210, the radio communication unit 220, and the network communication unit 230 described with reference to FIG. 9 are similar to the antenna unit 110, the radio communication unit 120, and the network communication unit 130.

10.3. Application Examples Regarding Second Base Station (First Application Example)

Figure 17:
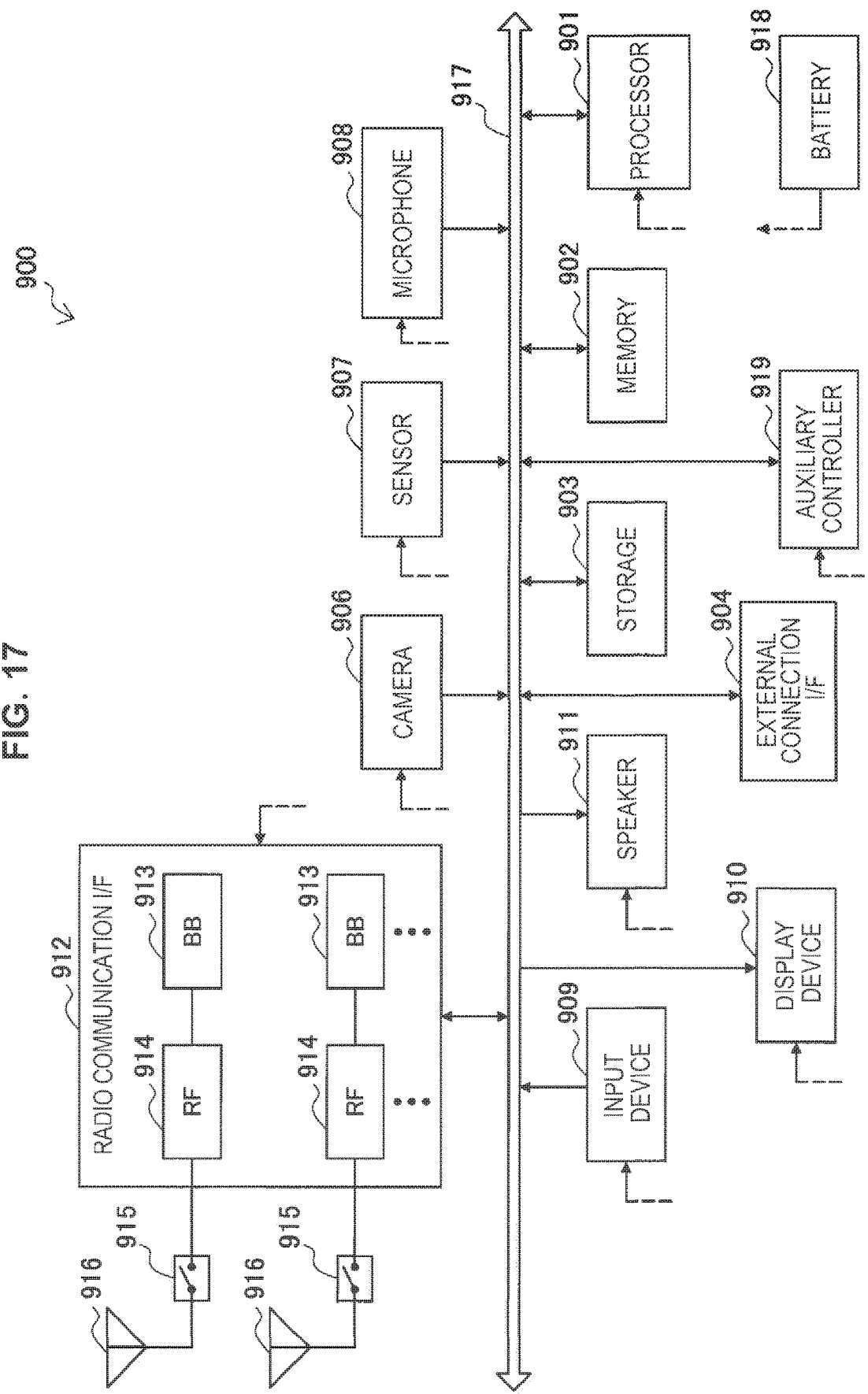
FIG. 17 is a block diagram showing an example of a schematic configuration of a smartphone.

FIG. 17 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system-on-a-chip (SoC), and controls functions of an application layer and another layer of the smartphone 900. The memory 902 includes a RAM and a ROM, and stores a program that is executed by the processor 901, and data. The storage 903 may include a storage medium such as a semiconductor memory and a hard disk. The external connection interface 904 is an interface for connecting an external device such as a memory card and a Universal Serial Bus (USB) device to the smartphone 900.

The camera 906 includes an image sensor such as a charge coupled device (CCD) or a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as shown in FIG. 17. Although FIG. 17 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance radio communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in a MIMO antenna), and is used for the radio communication interface 912 to transmit and receive radio signals. The smartphone 900 may include the multiple antennas 916, as shown in FIG. 17. Although FIG. 17 shows the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 17 via feeder lines, which are partially shown as dashed lines in the figure. The auxiliary controller 919 operates a minimum necessary function of the smartphone 900, for example, in a sleep mode.

At least a part of the constituent elements included in the processing unit 250 (for example, the information acquisition unit 251 and/or the control unit 253) described with reference to FIG. 9 may be implemented by the radio communication interface 912 of the smartphone 900 shown in FIG. 17. Alternatively, the at least part of the constituent elements may be implemented by the processor 901 or the auxiliary controller 919. As an example, the smartphone 900 may have a module that includes a part or all of the radio communication interface 912 (for example, the BB processor 913), the processor 901, and/or the auxiliary controller 919, and the constituent elements may be implemented by the module. In this case, the module may store a program for causing a processor to function as the constituent elements (in other words, a program for causing a processor to execute operations of the constituent elements) and execute the program. As another example, a program for causing a processor to function as the constituent elements may be installed in the smartphone 900 and the radio communication interface 912 (for example, the BB processors 913), the processor 901, and/or the auxiliary controller 919 may execute the program. As described above, the smartphone 900 or the module may be provided as an apparatus that includes the constituent elements, or a program for causing a processor to function as the constituent elements may be provided. In addition, a readable recording medium in which the program is recorded may be provided.

Furthermore, the radio communication unit 220 described with reference to FIG. 9 may be implemented by, for example, the radio communication interface 912 (for example, the RF circuits 914) in the smartphone 900 shown in FIG. 17. In addition, the antenna unit 210 may be implemented by the antennas 916.

(Second Application Example)

Figure 18:
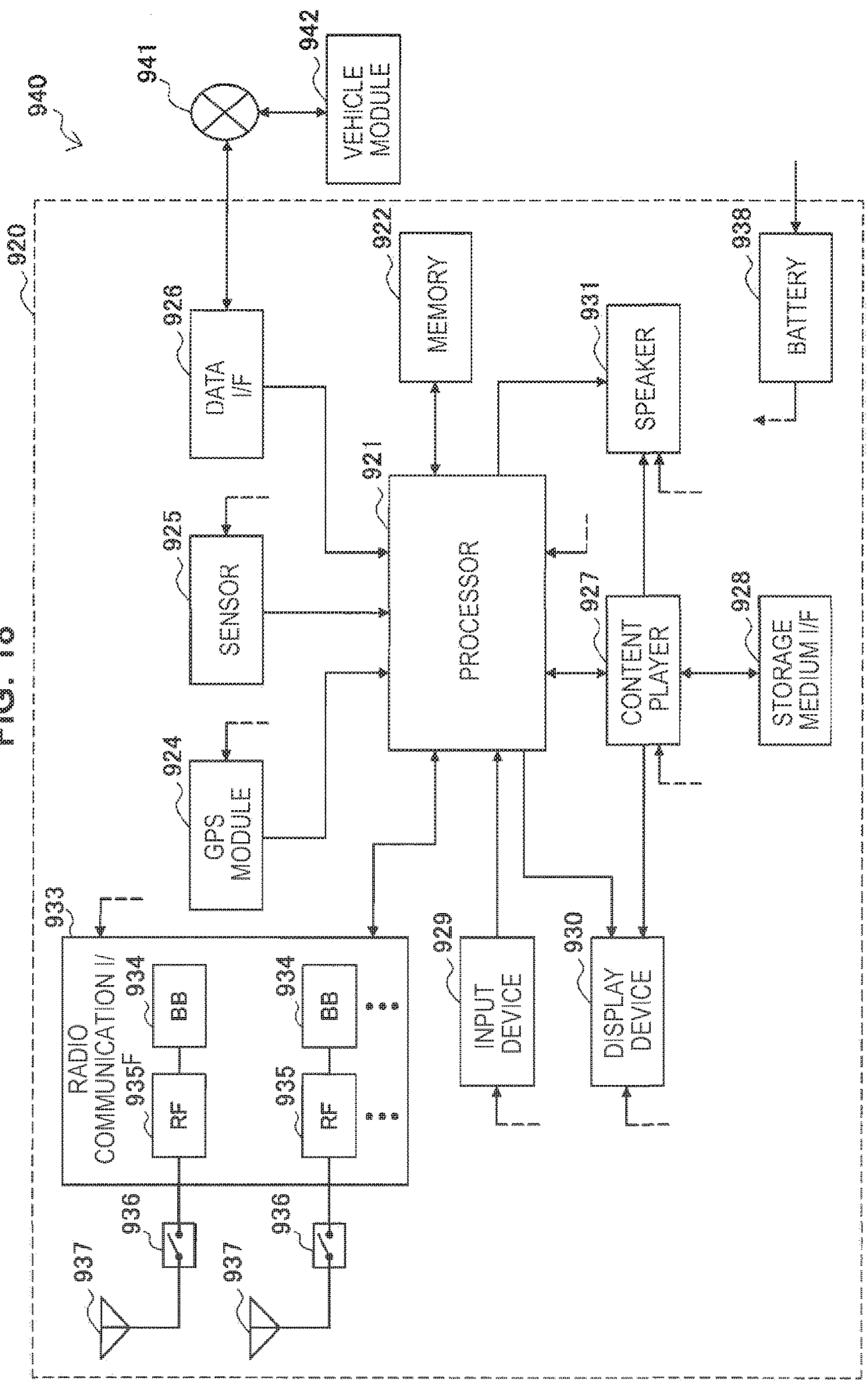
FIG. 18 is a block diagram showing an example of a schematic configuration of a car navigation apparatus.

FIG. 18 is a block diagram showing an example of a schematic configuration of a car navigation apparatus 920 to which the technology of the present disclosure may be applied. The car navigation apparatus 920 includes a processor 921, a memory 922, a Global Positioning System (GPS) module 294, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or an SoC, and controls a navigation function and another function of the car navigation apparatus 920. The memory 922 includes a RAM and a ROM, and stores a program that is executed by the processor 921, and data.

The GPS module 294 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as shown in FIG. 18. Although FIG. 18 shows the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance radio communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in a MIMO antenna), and is used for the radio communication interface 933 to transmit and receive radio signals. The car navigation apparatus 920 may include the multiple antennas 937, as shown in FIG. 18. Although FIG. 18 shows the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 shown in FIG. 18 via feeder lines that are partially shown as dashed lines in the figure. The battery 938 accumulates power supplied form the vehicle.

The constituent elements included in the processing unit 250 (for example, the information acquisition unit 251 and/or the control unit 253) described with reference to FIG. 9 may be implemented by the radio communication interface 933 of the car navigation apparatus 920 shown in FIG. 18. Alternatively, at least a part of the constituent elements may be implemented by the processor 921. As an example, the car navigation apparatus 920 may have a module that includes a part or all of the radio communication interface 933 (for example, the BB processor 934) and/or the processor 921, and the constituent elements may be implemented by the module. In this case, the module may store a program for causing a processor to function as the constituent elements (in other words, a program for causing a processor to execute operations of the constituent elements) and execute the program. As another example, a program for causing a processor to function as the constituent elements may be installed in the car navigation apparatus 920 and the radio communication interface 933 (for example, the BB processors 934), and/or the processor 921 may execute the program. As described above, the car navigation apparatus 920 or a program for causing a processor to function as the constituent elements may be provided. In addition, a readable recording medium in which the program is recorded may be provided.

Furthermore, the radio communication unit 220 described with reference to FIG. 9 may be implemented by, for example, the radio communication interface 933 (for example, the RF circuits 935) in the car navigation apparatus 920 shown in FIG. 18. In addition, the antenna unit 210 may be implemented by the antennas 937.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or the vehicle) 940 may be provided as an apparatus that includes the constituent elements (for example, the information acquisition unit 251 and/or the control unit 253). The vehicle module 942 generates vehicle data such as vehicle speed, engine speed, and trouble information, and outputs the generated data to the in-vehicle network 941.

11. CONCLUSION

Apparatuses and processes according to the embodiments of the present disclosure have been described so far with reference to FIGS. 1 to 18.

According to the embodiments of the present disclosure, the first base station 100 (or another network node) includes the information acquisition unit 151 that acquires information with regard to the second base station 200 that is the second base station 200 having the coverage area 20 that overlaps the coverage area 10 of the first base station 100 that can use a frequency band with priority and is incapable of using the frequency band with priority, and the control unit 153 that requests the second base station 200 to transmit data destined for a terminal apparatus that accesses the first base station 100 to the terminal apparatus.

In addition, according to the embodiments of the present disclosure, the second base station 200 is the second base station 200 having the coverage area 20 that overlaps the coverage area 10 of the first base station 100 which can use a frequency band with priority, and includes the information acquisition unit 251 that acquires data destined for a terminal apparatus that accesses the first base station 100 when the second base station 200 that is incapable of using the frequency band with priority receives a request to transmit the data to the terminal apparatus, and the control unit 253 that controls radio communication of the second base station 200.

Thus, for example, the frequency band can be used with higher efficiency.

Although exemplary embodiments of the present disclosure have been described above with reference to the accompanied by drawings, it is needless to say that the present disclosure is not limited to thereto. It is obvious that a person skilled in the art can conceive various modified examples or altered examples with the scope described in the claims, they are of course understood as coming under the technical scope of the present disclosure.

For example, although the example in which the third radio communication system having a higher priority level than the first base station (or the first radio communication system that includes the first base station) is present has been described, the present disclosure is not limited thereto. For example, the third radio communication system may not be present. That is, users of a frequency band may be divided into two groups (for example, two "tiers"), rather than three groups (for example, three "tiers").

Further, it is not necessary to chronologically execute the processing steps in the processing in the present specification in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, a CPU and a DSP) provided at apparatuses (for example, a base station, a base station apparatus for the base station, or a module for the base station or the base station apparatus, or another network node or a module for the other network node) in the present specification function as the components (for example, an information acquiring unit or the control unit) of the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components (for example, an information acquiring unit or the control unit) of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An apparatus including:

an acquisition unit configured to acquire information regarding a second base station that is a second base station having a coverage area that overlaps a coverage area of a first base station capable of using a frequency band with priority, and is incapable of using the frequency band with priority; and a control unit configured to request the second base station to transmit data destined for a terminal apparatus that accesses the first base station to the terminal apparatus.

(2)

The apparatus according to (1), wherein the control unit requests the second base station to transmit the data to the terminal apparatus using the frequency band.

(3)

The apparatus according to (2), wherein the control unit permits the second base station to use the frequency band.

(4)

The apparatus according to (3), wherein the control unit permits the second base station to use a part or a whole of the frequency band in a period in which the first base station does not use the part or the whole of the frequency band.

(5)

The apparatus according to (3) or (4), wherein the control unit cancels the permission for the second base station to use the frequency band.

(6)

The apparatus according to any one of (2) to (5), wherein the first base station and the second base station are synchronized with each other.

(7)

The apparatus according to any one of (1) to (6), wherein the control unit requests the second base station to transmit the data to the terminal apparatus using another frequency band available to the second base station.

(8)

The apparatus according to any one of (1) to (7), wherein the control unit requests the second base station to transmit the data to the terminal apparatus using at least one selected from the frequency band and another frequency band available to the second base station.

(9)

The apparatus according to (8), wherein the at least one selected from the frequency band and the other frequency band is a band selected based on an amount or a ratio of radio resources available to the second base station for transmission of the data among radio resources of the other frequency band.

(10)

The apparatus according to any one of (1) to (9), wherein the second base station is capable of using the frequency band under a condition that interference with a radio communication system capable of using the frequency band with priority be avoided or suppressed.

(11)

The apparatus according to (10), wherein the second base station can use a part or a whole of the frequency band in a period in which the radio communication system does not use the part or the whole of the frequency band.

(12)

The apparatus according to (11), wherein the control unit notifies the second base station of the period.

(13)
The apparatus according to any one of (1) to (9), wherein the second base station is incapable of using the frequency band without permission.
(14)
The apparatus according to any one of (1) to (13), wherein the control unit instructs the terminal apparatus to use a band used by the second base station for transmission of the data as a secondary component carrier accompanied by a primary component carrier used by the first base station.
(15)
The apparatus according to any one of (1) to (14), wherein the control unit gives an instruction to the second base station with regard to a link direction of a band used by the second base station for transmission of the data.
(16)
The apparatus according to (15), wherein the instruction includes an instruction on duplex scheme to be applied to the band.
(17)
The apparatus according to (15) or (16), wherein the instruction includes an instruction of a Time Division Duplex (TDD) configuration applied to the band.
(18)
The apparatus according to (17), wherein the TDD configuration is a TDD configuration in which all subframes are downlink subframes.
(19)
The apparatus according to (15) or (16), wherein the instruction includes an instruction of use of the band as a downlink band.
(20)
The apparatus according to any one of (1) to (19),
wherein the frequency band is a band that is used by another radio communication system with priority over a radio communication system that includes the first base station, and
the first base station is capable of using the frequency band under a condition that interference with the other radio communication system be avoided or suppressed.
(21)
The apparatus according to (20),
wherein the control unit requests the second base station to transmit the data to the terminal apparatus using the frequency band, and
the control unit permits the second base station for use of the frequency band within a range within which the first base station is capable of using the frequency band.
(22)
The apparatus according to any one of (1) to (21), wherein the apparatus is the first base station, a base station apparatus for the first base station, or a module for the first base station or the base station apparatus, or another network node or a module for the other network node.
(23)
An apparatus including:
an acquisition unit configured to acquire data destined for a terminal apparatus that accesses a first base station capable of using a frequency band with priority when a second base station that is a second base station having a coverage area which overlaps a coverage area of the first base station, and is incapable of using the frequency band with priority receives a request to transmit the data to the terminal apparatus; and
a control unit configured to control radio communication of the second base station so that the second base station transmits the data to the terminal apparatus.

(24)
The apparatus according to (23), wherein the control unit controls the radio communication so that the second base station transmits the data to the terminal apparatus using the frequency band.
(25)
The apparatus according to (23) or (24), wherein the control unit controls the radio communication so that the second base station transmits the data to the terminal apparatus using another frequency band available to the second base station.
(26)
The apparatus according to any one of (23) to (25), wherein the control unit controls the radio communication so that the second base station uses a band used for transmission of the data as a secondary component carrier accompanied by a primary component carrier used by the first base station.
(27)
The apparatus according to any one of (23) to (26), wherein the control unit controls the radio communication according to an instruction to the second base station with regard to a link direction of a band used by the second base station for transmission of the data.
(28)
The apparatus according to any one of (23) to (27), wherein the apparatus is the second base station, a base station apparatus for the second base station, or a module for the second base station or the base station apparatus.
(29)
The apparatus according to any one of (1) to (28),
wherein the first base station is a base station of a macrocell, and
the second base station is a base station of a small cell that overlaps the macrocell.
(30)
The apparatus according to any one of (1) to (29),
wherein the first base station is a base station operated by a first service provider, and
the second base station is a base station operated by a second service provider that is different from the first service provider.
(31)
The apparatus according to any one of (1) to (28), wherein the second base station is a terminal apparatus operable as a base station.
(32)
A method including:
acquiring information regarding a second base station that is a second base station having a coverage area that overlaps a coverage area of a first base station capable of using a frequency band with priority, and is incapable of using the frequency band with priority; and
requesting, by a processor, the second base station to transmit data destined for a terminal apparatus that accesses the first base station to the terminal apparatus.
(33)
A program for causing a processor to execute:
acquiring information regarding a second base station that is a second base station having a coverage area that overlaps a coverage area of a first base station capable of using a frequency band with priority, and is incapable of using the frequency band with priority; and
requesting the second base station to transmit data destined for a terminal apparatus that accesses the first base station to the terminal apparatus.

(34)

A readable recording medium having a program recorded thereon, the program causing a processor to execute:

acquiring information regarding a second base station that is a second base station having a coverage area that overlaps a coverage area of a first base station capable of using a frequency band with priority, and is incapable of using the frequency band with priority; and requesting the second base station to transmit data destined for a terminal apparatus that accesses the first base station to the terminal apparatus.

(35)

A method including:

acquiring data destined for a terminal apparatus that accesses a first base station capable of using a frequency band with priority when a second base station that is a second base station having a coverage area which overlaps a coverage area of the first base station, and is incapable of using the frequency band with priority receives a request to transmit the data to the terminal apparatus; and controlling, by a processor, radio communication of the second base station so that the second base station transmits the data to the terminal apparatus.

(36)

A program for causing a processor to execute:

acquiring data destined for a terminal apparatus that accesses a first base station capable of using a frequency band with priority when a second base station that is a second base station having a coverage area which overlaps a coverage area of the first base station, and is incapable of using the frequency band with priority receives a request to transmit the data to the terminal apparatus; and controlling radio communication of the second base station so that the second base station transmits the data to the terminal apparatus.

(37)

A readable recording medium having a program recorded thereon, the program causing a processor to execute:

acquiring data destined for a terminal apparatus that accesses a first base station capable of using a frequency band with priority when a second base station that is a second base station having a coverage area which overlaps a coverage area of the first base station, and is incapable of using the frequency band with priority receives a request to transmit the data to the terminal apparatus; and controlling radio communication of the second base station so that the second base station transmits the data to the terminal apparatus.

(N1)

An apparatus including:

an acquisition unit configured to acquire information regarding a second base station having a coverage area that overlaps a coverage area of a first base station; and a control unit configured to request the first base station or the second base station to transmit or receive data transmitted and received between the second base station and a terminal apparatus that access the second base station via a radio backhaul that is the radio backhaul between the first base station and the second base station and uses a frequency band available to the second base station.

(N2)

The apparatus according to (N1), wherein the frequency band is a frequency band permitted to be used for the radio backhaul.

(N3)

The apparatus according to (N2), wherein the frequency band is a frequency band permitted by the second base station to be used for the radio backhaul.

(N4)

The apparatus according to (N2) or (N3), wherein the frequency band is a frequency band permitted to be used for the radio backhaul in a period in which the second base station does not use the frequency band for communication with a terminal apparatus.

(N5)

The apparatus according to any one of (N1) to (N4), wherein the apparatus is the first base station, a base station apparatus for the first base station, or a module for the base station apparatus, and the control unit requests the second base station to transmit or receive the data via the radio backhaul.

(N6)

The apparatus according to any one of (N1) to (N4), wherein the apparatus is a network node different from the first base station and the second base station, or a module for the network node, and the control unit requests one of or both the first base station and the second base station to transmit or receive the data via the radio backhaul.

(N7)

The apparatus according to any one of (N1) to (N4), wherein the apparatus is the second base station, a base station apparatus for the second base station, or a module for the base station apparatus, and the control unit requests the first base station to transmit or receive the data via the radio backhaul.

REFERENCE SIGNS LIST

1 system
10, 20 coverage area
31, 33 frequency band
100 first base station
151 information acquisition unit
153 control unit
200 second base station
251 information acquisition unit
253 control unit

The invention claimed is:

1. A terminal apparatus comprising circuitry configured to:

communicate with a base station via a wireless backhaul in a frequency band assigned to the base station in a coverage area of the base station;

send identification information identifying the terminal apparatus to a base station via the wireless backhaul;

receive resource information from the base station via the wireless backhaul, wherein the radio resource information indicates at least part of the frequency band assigned to the base station;

receive permission to use the indicated part of the frequency band from the base station via the wireless backhaul, wherein the terminal apparatus is incapable of using the indicated part of the frequency band without the permission; and operate the terminal apparatus as a second base station and communicate with a second terminal apparatus disposed in a second coverage area of the terminal apparatus using the indicated at least part of the frequency band.

2. The terminal apparatus of claim 1, wherein the second coverage area of the terminal apparatus at least partially overlaps the coverage area of the base station.

3. The terminal apparatus of claim 1, wherein the terminal apparatus is synchronized with the base station.

4. The terminal apparatus of claim 1, wherein the circuitry is further configured to map data for transmission to the second terminal apparatus to the indicated at least part of the frequency band.

5. The terminal apparatus of claim 1, wherein the base station establishes the wireless backhaul with the terminal apparatus in a frequency band with priority.

6. The terminal apparatus of claim 1, wherein the circuitry is further configured to:
receive a request from the base station to transmit or receive data with the second terminal apparatus; and
send a response to the base station.

7. The terminal apparatus of claim 6, wherein the circuitry is further configured to:
receive data destined for the second terminal apparatus from the base station; and
forward the data to the terminal apparatus.

8. The terminal apparatus of claim 7, wherein the circuitry is further configured to:
receive second data from the second terminal apparatus; and
transmit the second data to the base station.

9. A base station comprising circuitry configured to:
establish a wireless backhaul with a terminal apparatus operating in a frequency band assigned to the base station in a coverage area of the base station;
receive identification information of the terminal apparatus from the terminal apparatus via the wireless backhaul;
transmit resource information to the terminal apparatus via the wireless backhaul, wherein the radio resource information indicates at least part of the frequency band assigned to the base station; and
transmit permission to use the indicated part of the frequency band to the terminal apparatus via the wireless backhaul, wherein the terminal apparatus is incapable of using the indicated part of the frequency band without the permission,
wherein the terminal apparatus operates as a second base station and communicates with a second terminal apparatus disposed in a second coverage area of the terminal apparatus using the indicated at least part of the frequency band.

10. The base station of claim 9, wherein the terminal apparatus is further configured to map data for transmission to the second terminal apparatus to the indicated at least part of the frequency band.

11. The base station of claim 9, wherein the second coverage area of the terminal apparatus at least partially overlaps the coverage area of the base station.

12. The base station of claim 9, wherein the terminal apparatus is synchronized with the base station.

13. The base station of claim 9, wherein the circuitry is further configured to:
transmit a synchronization signal to the terminal apparatus, wherein the terminal apparatus is synchronized based on the synchronization signal.

14. The base station of claim 9, wherein the circuitry is further configured to:
provide the terminal apparatus with information for synchronizing, wherein the terminal apparatus is synchronized based on the information for synchronizing.

15. The base station of claim 9, wherein the circuitry is further configured to:
instruct the second terminal apparatus to transmit data to the terminal apparatus using a particular frequency band.

16. The base station of claim 15, wherein the particular frequency band is used by the terminal apparatus as a secondary component carrier.

* * * * *